US012138556B2

(12) United States Patent
Jones et al.

(10) Patent No.: US 12,138,556 B2
(45) Date of Patent: Nov. 12, 2024

(54) GAMING SYSTEMS AND METHODS HAVING AUTOMATED DICE FEATURES

(71) Applicant: LNW Gaming, Inc., Las Vegas, NV (US)

(72) Inventors: William Jones, Boulder, CO (US); Aljosa Krupenko, Jesenice (SI); Christopher Wester, Henderson, NV (US); Ryan Yee, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 140 days.

(21) Appl. No.: 17/886,868

(22) Filed: Aug. 12, 2022

(65) Prior Publication Data

US 2023/0063430 A1 Mar. 2, 2023

Related U.S. Application Data

(60) Provisional application No. 63/237,617, filed on Aug. 27, 2021.

(51) Int. Cl.
*G07F 17/00* (2006.01)
*A63F 9/04* (2006.01)
*G07F 17/32* (2006.01)

(52) U.S. Cl.
CPC ........ *A63F 9/0468* (2013.01); *G07F 17/3209* (2013.01); *G07F 17/3211* (2013.01); *G07F 17/3213* (2013.01); *G07F 17/323* (2013.01); *G07F 17/3267* (2013.01)

(58) Field of Classification Search
None
See application file for complete search history.

(56) References Cited

U.S. PATENT DOCUMENTS 7,004,836 B2 2/2006 Kaminkow et al.
7,153,207 B2 12/2006 Kaminkow et al.
7,153,208 B2 12/2006 Kaminkow et al.
7,156,737 B2 1/2007 Kaminkow et al.
7,361,090 B2 * 4/2008 Lin .................... A63F 3/00157 273/145 C
7,857,310 B2 12/2010 Yoshizawa
(Continued)

OTHER PUBLICATIONS

"Modal", Webster's II New Riverside University Dictionary (1994), Boston, MA: The Riverside Publishing Company/Houghton Mifflin Company. (Year: 1994).*

*Primary Examiner* — Paul A D'Agostino

(57) ABSTRACT

A gaming system comprises a player terminal, an automated dice unit (ADU), and game-logic circuitry. The ADU automatically shakes at least one die to generate a dice outcome. The game-logic circuitry receives player input from a player selecting one or more dice games, prompts the player to provide a dice control parameter affecting an aspect of a dice roll, converts the dice control parameter into a control data element compatible with the ADU, transmits ADU control data including the control data element to the ADU, causes the ADU to extract the control data element and generate a dice outcome by generating a dynamic force applied to the die based at least partially on the control data element, generates a game outcome for each of the selected dice games based on the dice outcome, and causes an electronic display device of the player terminal to present the game outcomes.

21 Claims, 10 Drawing Sheets

(56) References Cited

U.S. PATENT DOCUMENTS

| | | | | |
|---|---|---|---|---|
| 7,874,905 | B2 | 1/2011 | Yoshizawa | |
| 8,079,593 | B2 | 12/2011 | Nicely et al. | |
| 8,210,923 | B2 | 7/2012 | Kido et al. | |
| 8,215,640 | B2 * | 7/2012 | Sasaki | G07F 17/322 273/145 E |
| 8,216,057 | B2 | 7/2012 | Yoshihara | |
| 8,216,067 | B2 * | 7/2012 | Kishi | G07F 17/3213 463/20 |
| 8,257,166 | B2 | 9/2012 | Kido | |
| 8,376,362 | B2 | 2/2013 | Nicely et al. | |
| 8,622,391 | B2 | 1/2014 | Nicely et al. | |
| 8,684,812 | B2 | 4/2014 | Kishi | |
| 8,998,698 | B2 | 4/2015 | Kishi | |
| D843,472 | S | 3/2019 | Castro et al. | |
| 2007/0145680 | A1 * | 6/2007 | Rosenberg | A63F 9/0468 273/138.1 |
| 2009/0181769 | A1 * | 7/2009 | Thomas | G07F 17/3211 463/32 |
| 2010/0267437 | A1 * | 10/2010 | Ansari | G07F 17/3232 463/16 |
| 2011/0053677 | A1 * | 3/2011 | Munakata | G07F 17/32 463/20 |
| 2016/0012671 | A1 * | 1/2016 | Alsip | G07F 17/3227 463/22 |
| 2018/0085660 | A1 | 3/2018 | Bergant et al. | |
| 2018/0085661 | A1 | 3/2018 | Bergant et al. | |
| 2018/0089477 | A1 | 3/2018 | Bergant et al. | |
| 2018/0104572 | A1 | 4/2018 | Bergant et al. | |
| 2018/0111042 | A1 * | 4/2018 | Bergant | A63F 9/0406 |

* cited by examiner

GAMING SYSTEMS AND METHODS HAVING AUTOMATED DICE FEATURES

CROSS-REFERENCE TO RELATED APPLICATIONS

This application claims the benefit of priority of U.S. Provisional Patent Application No. 63/237,617, filed Aug. 27, 2021, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021 S G Gaming, Inc.

FIELD

The present disclosure relates generally to gaming systems, apparatus, and methods and, more particularly, to game features incorporating one or more automated dice shakers.

BACKGROUND

In the gaming industry, games based on the use of physical cards, markers, dice, and/or the like have remained popular even as the age of digital gaming matures. These physical game elements may appeal to certain players for their relative ease in accepting the random aspect of determining an outcome. For example, a rolled die or a card drawn from a well-shuffled deck may be easier for some players to accept as random outcomes in comparison to back-end random-number generation (even if the rolled die or drawn card do incorporate some form of digital random-number generation). In addition, some players may appreciate the physical interaction with these game elements in comparison to digital game elements.

However, the physical nature of the game elements may limit the flexibility of the underlying games and the ability of a gaming environment to adapt to the needs of the current players in the gaming environment. For example, dice games may typically be played using a physical table with markings identifying different bet areas, play areas, and the like. These markings may not be applicable to other dice games that may be played at a similar table. Moreover, the tables themselves may occupy a substantial portion of floor space within the gaming environment for dice games irrespective of the number of participating players. These games may not be adaptable to match the current players' needs by either (i) having limited capacity to join popular dice games based on the number of tables, or (ii) lacking capacity for unique or less popular games.

Accordingly, new and unique gaming systems are required to provide games combining the physical game elements desired by players and the adaptability of digital games to adjust to the players.

SUMMARY

According to one aspect of the present disclosure, a gaming system comprises one or more gaming controllers configured to conduct a first dice game and a second dice game, at least one display device configured to present the first dice game and the second dice game, a plurality of dice having respective dice identifiers and a respective plurality of indicia associated with outcome values, and one or more automated dice units (ADUs). The one or more ADUs are configured to house the plurality of dice and shake the plurality of dice via at least one force mechanism to generate a dice outcome. The one or more gaming controllers are configured to detect, via at least one sensor associated with the one or more ADUs and in response to generating the dice outcome, outcome indicia for each die of the plurality of dice, identify a first set of dice and a second set of dice at least partially different from the first set of dice from the plurality of dice, translate the detected outcome indicia of the first set of dice into outcome values for a first game outcome associated with the first dice game and the detected outcome indicia of the second set of dice into outcome values for a second game outcome associated with the second dice game, and cause the at least one display device to present the first game outcome and the second game outcome.

According to another aspect of the present disclosure, a method for conducting a plurality of dice games including a first dice game and a second dice game with a gaming system is provided. The gaming system comprises one or more gaming controllers, at least one display device, a plurality of dice, and one or more ADUs that house the plurality of dice. Each die is associated with a respective dice identifier and has a plurality of indicia associated with respective outcome values. The method comprises shaking, by the ADUs, the plurality of dice via at least one force mechanism to generate a dice outcome, detecting, via at least one sensor associated with the ADUs and in response to generating the dice outcome, an outcome indicia for each die of the plurality of dice, identifying, by the gaming controllers, a first set of dice and a second set of dice at least partially different from the first set of dice from the plurality of dice, translating, by the one or more gaming controllers, the detected outcome indicia of the first set of dice into outcome values for a first game outcome associated with the first dice game and the detected outcome indicia of the second set of dice into outcome values for a second game outcome associated with the second dice game, and causing, by the one or more gaming controllers, the at least one display device to present the first game outcome and the second game outcome.

According to yet another aspect of the present disclosure, a gaming controller communicatively coupled to at least one display device configured to present a first dice game and a second dice game and one or more automated dice units (ADUs) configured to house a plurality of dice is provided. Each die is associated with a respective dice identifier and has a plurality of indicia associated with respective outcome values. The gaming controller comprises game-logic circuitry configured to receive player input identifying a first set of dice and a second set of dice from the plurality of dice, wherein the first set of dice is associated with the first dice game and the second set of dice is associated with the second dice game. The game-logic circuitry is further configured to cause the ADUs to shake the plurality of dice via at least one force mechanism to generate a dice outcome, detect, via at least one sensor associated with the one or more ADUs and in response to generating the dice outcome, an outcome indicia for each die of the plurality of dice, identify the outcome indicia of the first set of dice and the outcome indicia of the second set of dice from the dice outcome, translate the outcome indicia of the first set of dice into outcome values for a first game outcome associated with the first dice game and the outcome indicia of the second set of dice into outcome values for a second game outcome associated with the second dice game, and cause the at least one display device to present the first game outcome and the second game outcome.

According to a further aspect of the present disclosure, a player terminal configured to primarily conduct a plurality of dice games is provided. The player terminal comprises an electronic display device and game-logic circuitry. The game-logic circuitry is configured to receive player input from a player selecting one or more dice games from the plurality of dice games for participation, prompt, via the electronic display device, the player to provide a dice control parameter affecting an aspect of a dice roll of an ADU configured to house at least one die, convert, in response to receiving a player selection of the dice control parameter, the dice control parameter into a control data element having a machine-readable format compatible with the ADU, and transmit ADU control data including the control data element to the ADU. The ADU is configured to extract the control data element and generate a dice outcome by generating a dynamic force applied to the at least one die, wherein the dynamic force adjusted based at least partially on the control data element. The game-logic circuitry is further configured to generate a game outcome for each of the selected one or more dice games based on the dice outcome and cause the electronic display device to present the game outcome for each of the selected one or more dice games.

According to yet another aspect of the present disclosure, a gaming system comprises a player terminal, an ADU, and game-logic circuitry. The player terminal comprises an electronic display device and at least one player input device. The ADU is configured to house at least one die and automatically shake the at least one die via at least one force mechanism to generate a dice outcome. The game-logic circuitry is configured to receive, via the at least one player input device, player input from a player selecting one or more dice games from a plurality of dice games for participation, prompt, via the electronic display device, the player to provide a dice control parameter affecting an aspect of a dice roll of the ADU, convert, in response to receiving a player selection of the dice control parameter, the dice control parameter into a control data element having a machine-readable format compatible with the ADU, transmit ADU control data including the control data element to the ADU, cause the ADU to extract the control data element and generate a dice outcome by generating a dynamic force applied to the at least one die, wherein the dynamic force is adjusted based at least partially on the control data element, generate a game outcome for each of the selected one or more dice games based on the dice outcome, and cause the electronic display device to present the game outcome for each of the selected one or more dice games.

According to yet another aspect of the present disclosure, a method for conducting a plurality of dice games using a gaming system is provided. The gaming system comprises an electronic display device, at least one player input device, an ADU configured to house at least one die, and game-logic circuitry. The game-logic circuitry is in communication with the electronic display device, the at least one player input device, and the ADU. The method comprises receiving, via the at least one player input device, player input from a player selecting one or more dice games from a plurality of dice games for participation, prompting, via the electronic display device, the player to provide a dice control parameter an aspect of a dice roll of the ADU, converting, by the game-logic circuitry and in response to receiving a player selection of the dice control parameter, the dice control parameter into a control data element having a machine-readable format compatible with the ADU, transmitting, by the game-logic circuitry, ADU control data including the control data element to the ADU, causing, by the game-logic circuitry, the ADU to extract the control data element and generate a dice outcome by generating a dynamic force applied to the at least one die using at least one force mechanism, wherein the dynamic force is adjusted based at least partially on the control data element, generating, by the game-logic circuitry, a game outcome for each of the selected one or more dice games based on the dice outcome, and causing, by the game-logic circuitry, the electronic display device to present the game outcome for each of the selected one or more dice games.

Additional aspects of the invention will be apparent to those of ordinary skill in the art in view of the detailed description of various embodiments, which is made with reference to the drawings, a brief description of which is provided below.

Figure 1:
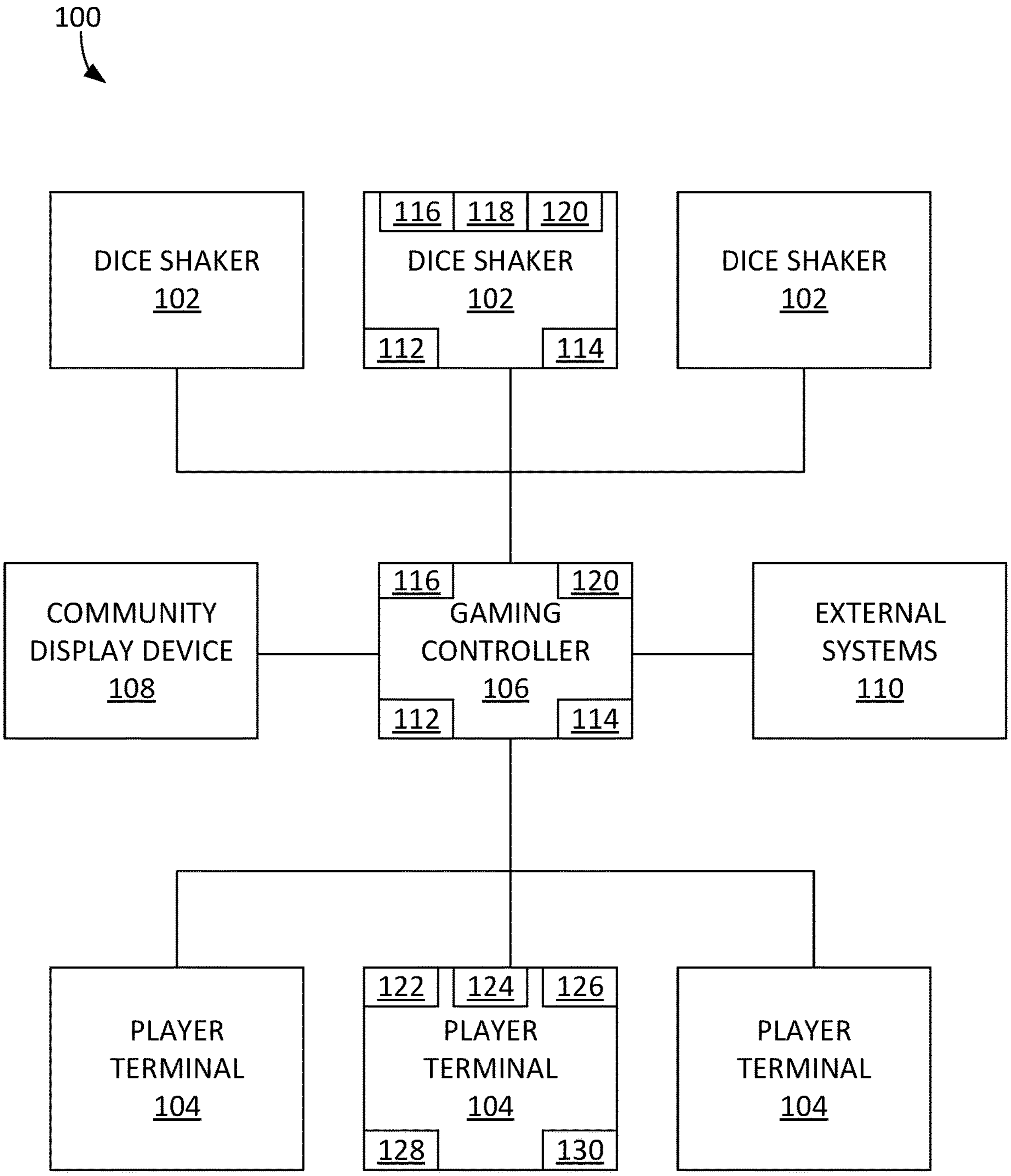
FIG. 1 is a block diagram of an example gaming system according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

As used herein, "game-logic" or "game-logic circuitry" refers to the hardware and software configured to administer and manage a game. This may include, for example, processors, memory devices, communication interfaces, game software (e.g., a set of instructions that cause the processors to administer and manage the game when executed), and/or other suitable elements that facilitate play and management of games. The game-logic may be within a single device (e.g., a free-standing gaming machine or a central gaming server) or distributed across a plurality of devices. For example, a game with a community feature may include game-logic at the gaming machine operated by the player for the non-community game features and a centralized gaming server or controller that includes game-logic for the community game feature for a plurality of gaming machines.

As used herein, a "die" or a set of "dice" refers to a game element separated into a plurality of unique areas, where each unique area is identified by a respective indicia or other visual characteristic. For example, a standard six-sided die may include one or more dot indicia on each side of the die, where the number of dots corresponds to an equivalent outcome value. Although the foregoing systems and methods may be described herein with the use of six-sided dice, it is to be understood that other forms of dice, such as a twenty-sided die or a circular die separated into a plurality of areas defined by visual borders applied to the die, may be used with the systems and methods described herein. In some embodiments, an assortment of dice having a plurality of configurations may be used.

The data generated and communicated as described herein may be structured and/or formatted to facilitate identification, retrieval, and/or extraction of the data for the functionality of the systems and methods described herein. In one example, the data may adhere to a particular data structure predefined by both the sender and the receiver, where data elements are extracted based on the predefined structure. In another example, the data may include a header or other data element for indicating the structure of the associated data elements. It is to be understood that the data elements comprising a particular type of data (e.g., game data, dice outcome data, player input data, etc.) may be divided or combined into any suitable configuration to facilitate data communication and/or storage.

Referring to FIG. 1, a gaming system 100 for conducting dice games is shown. The system 100 includes one or more automated dice units (ADUs) 102, one or more player terminals 104, one or more gaming controllers 106, a community display 108, and an external system 110. In other embodiments, the system 100 may include additional, fewer, or alternative subsystems, including those described elsewhere herein.

The ADUs 102 are configured to house at least one die for play of one or more dice games. The ADUs 102 are configured to shake, agitate, or otherwise move the dice to generate a random outcome for the dice games. That is, the ADUs 102 include one or more force mechanisms 112 that apply a dynamic force to the dice to disrupt the dice from an initial position and orientation. The force may be applied mechanically (e.g., a mechanism that engages the dice or the surface the dice are resting upon), electrically, and/or other suitable mechanisms for applying force to the dice directly or indirectly (e.g., tipping the surface the dice rest upon). The force mechanism 112 may be powered by an internal or external motor or power supply. In certain embodiments, the force mechanism 112 may be manually operated. In at least some embodiments, the force mechanism 112 may be selectively controlled to adjust the amount and/or duration of the applied force. In such embodiments, this control may be used to add an additional level of randomness to the outcome of the dice roll or shake. This control may be provided to one or more players during play of the dice games to give the players enhanced participation in the game and to simulate the experience of a dice game at a physical gaming table.

In the example embodiment, the force mechanism 112 includes a platform on which the dice rest and an arm coupled to the platform to move the platform (e.g., along a vertical axis). The movement of the platform may apply a sufficient force to disrupt the dice from their respective resting positions and orientations. The dice may then roll, spin, collide, and/or otherwise move within the ADU 102 until settling into respective resting positions and orientations. The movement is dependent upon a plurality of variables sensitive to changes in the force and/or environment of each die, and therefore may be considered random for purposes of the games described herein. Typically, the indicia of the upwards-facing sides of the dice form the roll outcome (also may be referred to herein as a "dice outcome" or "shake outcome"). However, it is to be understood that other suitable sides of the dice (e.g., the downward-facing sides) may be used in the roll outcome.

In the example embodiment, the ADUs 102 may further include one or more sensors 114, processors 116, memory devices 118, and communication interfaces 120. The sensors 114 may include one or more sensors for detecting the outcome faces of the dice. In one example, the dice may include radio frequency identification (RFID) tags, and the sensors 114 include at least one RFID reader configured to retrieve data from the dice communicated via an RFID signal. In another example, the sensors 114 may include an image sensor that captures an image including the outcome faces for image analysis. In addition to detecting the indicia of the outcome faces, the sensors 114 may be configured to extract other data from the dice, such as, and without limitation, an identity of each die to distinguish the dice from each other or another suitable characteristic of each die. In one example, the play area in which the dice are rolled may include markings or indicia that may impact the outcome of the dice roll (e.g., indicia on the play area that add or subtract a value from the value on the outcome faces depending on the location of the dice). In at least some embodiments, the sensors 114 may include sensors for purposes other than detecting the outcome of a dice roll. For example, image sensors may be used to capture a video feed of within the ADU 102 to enable players to watch the dice roll without requiring the players to be physically near the ADU 102.

The processor 116 is in communication with the force mechanism 112, the sensors 114, the memory device 118, the communication interface 120, and/or other components of the ADU 102. The processor 116 is configured to execute computer-readable instructions stored in the memory device 118 to cause the ADU 102 (and its components) to function as described herein. For example, the processor 116 may cause the force mechanism 112 to activate and to control the amount and/or duration of the applied force. In certain embodiments, the processor 116 may be configured to perform at least some of the functions of other devices within the system 100 described herein. For example, the processor 116 may be configured to manage or administer one or more dice games (i.e., operate as game-logic).

The communication interface 120 is configured to facilitate communication between the ADU 102 and other devices within and/or external to the system 100. More specifically, the communication interface 120 includes one or more antennas, ports, cables, drivers, networking devices, and the like to enable communication via one or more wired or wireless communication protocols. The communication interface 120 may be used to communicate between the ADUs 102, which may enable the ADUs 102 to synchronize and/or schedule dice rolls with each other. In one example, the communication interface 120 facilitates communication between the ADUs 102 and the gaming controller 106 and/or the external systems 110. In another example shown in FIG. 2, the communication interface 120 may enable the ADUs 102 to communicate with the player terminals 104 and/or the community display device 108 rather than or in addition to the gaming controller 106 and/or the external systems 110.

The player terminals 104 are configured to present one or more dice games to players and receive player input from the players. In the example embodiment, each player terminal 104 includes one or more processors 122, memory devices 124, communication interfaces **12*ffig*, input devices 128, and/or output devices 130. The processor 122, memory device 124, and the communication interface 126 may be similar to the processor 116, memory device 118, and the communication interface 120 of the ADU 102** or have another suitable architecture or configuration to perform the functions described herein.

The input devices 128 may be configured to receive player input and/or other suitable forms of input, such as credit inputs. For example, the input devices 128 may include, without limitation, buttons, touchscreens, joysticks, triggers, knobs, levers, touchpads, wireless antennas, cameras, microphones, card readers, ticket readers, bill acceptors, coin acceptors, barcode scanners, and/or other suitable devices for receiving input (an action or a physical item). The player input enables a player to interact with games presented by the player terminal 104. For example, the player may be able to place wagers and configure one or more parameters of a game through a touchscreen on the player terminal 104. In another example, the player may provide player input to at least partially control the force mechanism 112 of a ADU 102.

The credit input devices of the input devices 128 may be used to receive physical items and/or data that represent a monetary currency or other suitable form of currency. Bills, tickets, coins, machine-readable cards, and the like may be physical items provided to the credit input devices, and digital wallets and/or other digital credit-tracking structures may provide data representing a credit input or credit balance to the player terminal 104. The games described herein may be wagering games in which these credit inputs are used to establish a credit balance to fund wagers for play of one or more games at the player terminal 104. Wagers are subtracted from the credit balance, and awards are added to the credit balance. At the conclusion of a game session, the player may initiate a cash-out sequence to receive a physical item or items including the remaining credit balance or an indication that the credit balance has been applied to a player account or digital wallet associated with the player. In some embodiments, the games described herein are not wagering games, or the games may be selectively played either as a wagering game or another form of game. In certain embodiments, a combination of wagering and non-wagering games may be conducted by the system 100.

In at least some embodiments, the input devices 128 include a card reader, near-field communication (NFC) reader, or the like to receive player account data. The player account data may be used to identify a player account associated with the player and link the player account to the current game session. The player account may be dedicated to gaming in one or more gaming environments or an account that is not specific to gaming, such as a digital wallet account, a rewards account for a non-gaming field (e.g., a airlines or credit card reward account), and the like. In certain embodiments, the credit input devices may be configured to receive player account data in addition to credit inputs.

The output devices 130 are configured to present or convey gameplay in addition to other presentation elements to the player. The output devices 130 may include, without limitation, display devices, speakers, emotive lighting devices, vibration motors, and/or other suitable devices for providing output. In one example, one or more display devices present the game to the player in addition to any other suitable information, such as the credit balance. In certain embodiments, at least some of the output devices 130 may be combined with one or more input devices 128. For example, a display device may include a touchscreen for receiving player input.

The player terminals 104 may be regulated gaming machines that are configured primarily to conduct games, such as wagering games. These terminals 104 may be deployed in a casino gaming environment with the ADUs 102. In other embodiments, other suitable devices may be included in the player terminals 104. That is, the player terminals 104 may not be limited to a single device configuration, but rather several forms of player terminals 104 may be used within the system 100. For example, the player terminals 104 may include mobile computing devices (e.g., smartphones, tablets, etc.), gaming machines dedicated to other types of games (e.g., a slot machine), and/or other suitable devices. These devices may store sets of instructions or the devices may access a remote system, such as via a web browser, to perform the functionalities of the player terminal 104 as described herein.

As described herein, each of the player terminals 104 may be configured to operate as a 'thin' client or a 'thick' client. That is, for thin client player terminals 104, a majority or all of the game-logic may be performed remotely from the player terminal 104 such that the player terminal 104 is primarily dedicated to receiving player input and outputting presentation elements (e.g., audiovisual and tactile elements) to the player as controlled by the remote device or devices, such as the gaming controller 106. For a thick client player terminal 104, at least a portion of the game-logic is present on the player terminal 104 such that the player terminal 104 may determine game outcomes, resolve wagers, generate presentation elements based on the game outcome, and the like. The configuration of the player terminals 104 between thin and thick client may be adjusted on a per-terminal basis and/or on a per-game basis, where the player terminals 104 is controlled to operate as thick or thin client for each game. The configuration of the player terminals 104 may be monitored and/or controlled by a remote device, such as the gaming controller 106 and/or the external systems 110.

The gaming controller 106 is configured to manage or administer the one or more games presented by the player terminals 104. The gaming controller 106 may be in communication with the ADUs 102, the player terminals 104, the community display device 108, and/or the external systems 110 to facilitate play of the games. Although the gaming controller 106 is shown as an independent, centralized device in FIG. 1, it is to be understood that other suitable configurations of the system 100 may be contemplated by the present disclosure. For example, the gaming controller 106 may be included within one or more ADUs 102, player terminals 104, and/or the external systems 110. In such an example, the gaming controller 106 may be discrete, dedicated hardware, a set of instructions stored by a memory device and executable by one or more processors, and/or combinations thereof. In another example, the gaming controller 106 may be formed from a plurality of distributed devices in communication with each other to perform the functions of the gaming controller 106 described herein. For example, different types of games (e.g., craps, poker, etc.) may have a dedicated gaming controller 106 that is in communication with a centralized database of the dice outcomes as described herein. Accordingly, the features and functions described herein for the gaming controller 106 may be performed by the other devices within the system 100, such as the ADUs 102 and the player terminals 104.

In some embodiments, the player terminals 104 conduct the games and communicate with the gaming controller 106 to retrieve dice outcome data from the ADUs 102. In such embodiments, the player terminals 104 may use the dice outcome data to generate game data for presenting the dice game to the player. In other embodiments, the gaming controller 106 may administer the dice game, and the gaming controller 106 may generate game data based on the dice outcome data to transmit to the player terminals 104. In certain embodiments, the gaming controller 106 may parse the dice outcome data to transmit the dice outcome data that is relevant to each player terminal 104 separately. The gaming controller 106 may analyze the dice outcome data to transmit additional data to the player terminals 104, such as data indicating near-miss outcomes (i.e., if the player had selected a different set of dice, the player would have won an award), statistics, notable winning outcomes in other games, and the like. It is to be understood that the administration and/or presentation functionality described herein may be performed by the player terminals 104 and/or the gaming controller 106.

In the example embodiment, the gaming controller 106 is configured to manage a plurality of games associated with the ADUs 102. More specifically, each player terminal 104 may enable its associated player to participate in one or more dice games through the gaming controller 106. The games may be conducted simultaneously, and the games may be communal between multiple players or dedicated games for each player. The dice outcomes may be interpreted or translated to a plurality of different outcomes within these games as described herein. As a result, the system 100 may be adaptable to a variety of player and operator preferences without requiring physical alterations to the system 100. For example, in the system 100, one player can play a craps-style game while another player plays a pai gow poker game and a simulated horse racing game (using dice) at the same time potentially based on the same dice from the ADUs 102. In a traditional dice game system, this arrangement would require several different tables dedicated to a different respective game, and the second player would need to move between the pai gow poker table and the simulated horse racing table to participate at the same time. Accordingly, the system 100 may represent an improvement in efficiency of device deployment in a gaming environment, which may enable the gaming environment operators to add additional devices or offer different floor plans within the gaming environment.

In at least some embodiments, the community display device 108 may be in communication with the gaming controller 106 to present graphical elements, video streams, information, and/or animations for a plurality of players and bystanders to view. That is, the community display device 108 may be positioned and oriented to be viewable from at least some of the player terminals 104. In one example, one or more video streams of the dice within the ADUs 102 may be presented by the community display device 108. In another example, the community display device 108 may present game statistics, animations for any major winning outcomes, and/or attraction animations. The community display device 108 may be accompanied by emotive lighting, speakers, and/or other output devices for attracting potential players and/or conveying information to the players. In some embodiments, the system 100 may include a plurality of community display devices 108. In other embodiments, the system 100 may not include any community display device 108. In such embodiments, the system 100 may or may not include communal emotive lighting, speakers, and/or other output devices.

In the example embodiment, the gaming controller 106 is in communication with one or more external systems 110 to facilitate the games provided by the system 100. For example, the gaming controller 106 may be in communication with a gaming server, an accounting server, a player account server, a web server, and the like. The external systems 110 may be remotely located from the system 100 or be located within the same gaming environment as the system 100. The external systems 110 may monitor game data from the gaming controller 106, wager data, and/or other suitable data from the system 100, and the external systems 110 may provide data back to the system 100 via the gaming controller 106. In certain embodiments, at least some of the functions described herein as functions of the system 100 may be performed by the external systems 110. For example, certain data described herein may be stored on a remote database for retrieval by the system 100. In another example, the external systems 110 may enable remote players to access the system 100 for play of the dice games. That is, the external systems 110 may function similar to the player terminals 104 to enable a player to play remotely.

In the example embodiment, the system 100 may be arranged in a stadium or theater configuration around the ADUs 102 and the community display device 108. That is, the player terminals 104 may be arranged in semicircular or parabolic rows. The rows may be arranged to offset player terminals 104 between rows and/or player terminals 104 located further away from the ADUs 102 may be elevated to view over the player terminals 104 in front. Such an arrangement of player terminals 104 may facilitate players to view the ADUs 102 and the community display device 108 directly, though video streams may still be available through the player terminal 104. It is to be understood that other suitable configurations of the system 100 are contemplated by the present disclosure, including configurations in which at least a portion of the terminals 104 may not be physically located near the ADUs 102 (e.g., a smartphone in communication with the gaming controller 106) and/or within line-of-sight of the ADUs 102.

Figure 2:
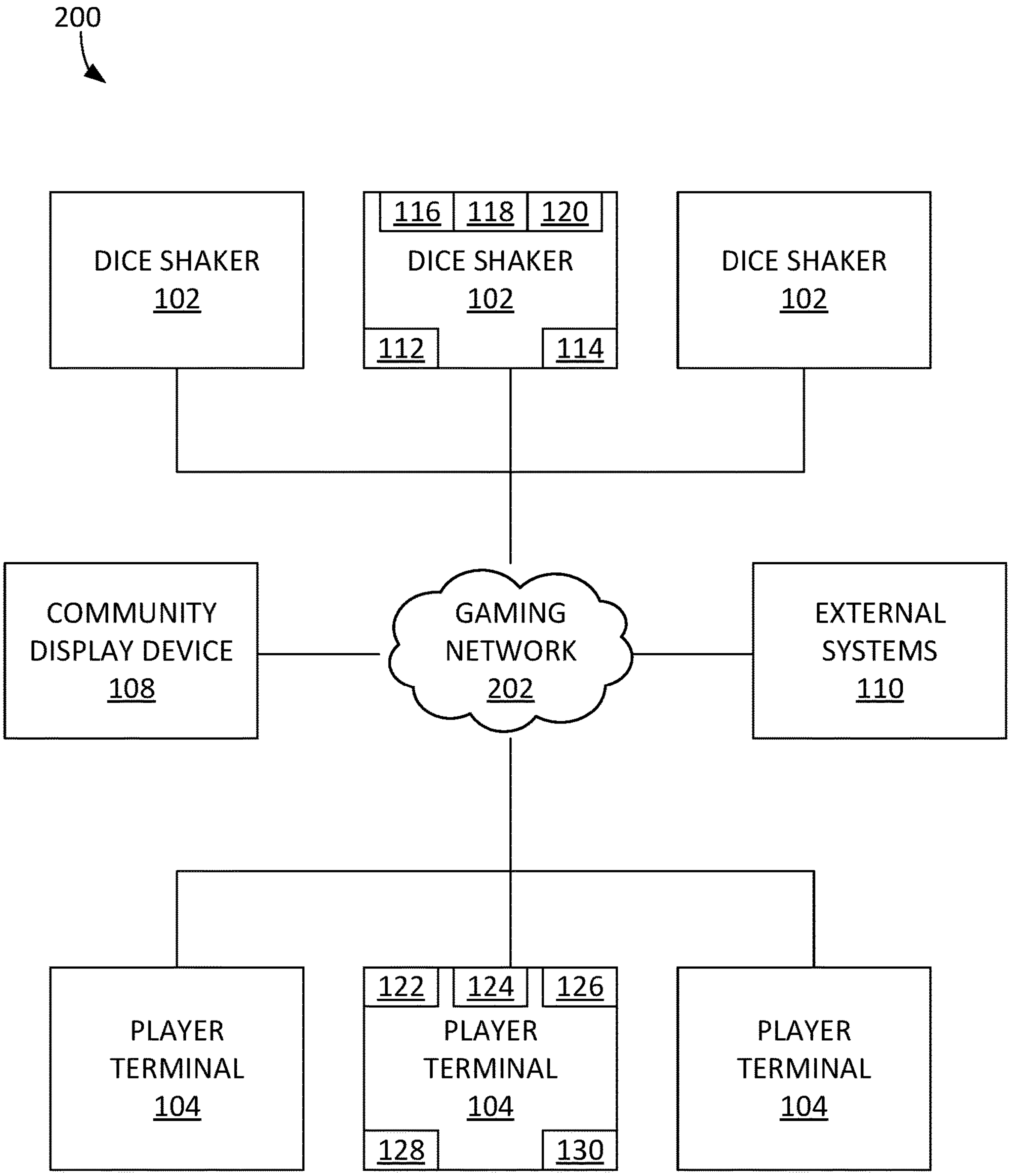
FIG. 2 is a block diagram of an example gaming system with a distributed control system, according to one or more embodiments of the present disclosure.

FIG. 2 is a block diagram of another gaming system 200 that may be used in combination with the methods and devices described herein. The system 200 is similar to the system 100 shown in FIG. 1 without the gaming controller 106 such that the functions of the gaming controller 106 as described herein are distributed to other devices within the system 200. In other embodiments, the system 200 may include additional, fewer, or alternative devices, including those described elsewhere herein.

In the example embodiment, the ADUs 102 may be configured to manage the communal aspects of the system 200. That is, the ADUs 102 may communicate the dice outcome data to the player terminals 104, cause the community display device 108 to display community presentation elements, and/or transmit dice outcome data and/or game data to the external systems 110. The ADUs 102 may manage the system 200 together, independently, within an ordered configuration (i.e., one ADU 102 acts as a primary controller of the system 200, while the other ADUs 102 operate as secondary controllers), and/or as a centralized controller, where one ADU 102 performs the functions of the gaming controller 106 shown in FIG. 1. In other embodiments, the player terminals 104 may manage the communal aspects of the system 200 in any suitable configuration similar to the ADUs 102.

In the example embodiment, a gaming network 202 may be defined to facilitate communication between the different devices of the system 200. The gaming network 202 may include a plurality of discrete networks to facilitate communication between different devices, communicating different forms of data, and/or applying different network and security protocols to the communications. For example, one network may be used to communicate game data (including dice outcome data), while another network may communicate wager data to an external accounting system. The gaming network 202 may be comprised of one or more networking devices and/or systems (e.g., routers, modems, switches, access points, antenna, signal repeaters, wires, etc.) that facilitate communication within and/or external to the system 200. The system 100 shown in FIG. 1 may include one or more networks similar to the system 200, though the configuration in the system 200 may be decentralized in comparison to the network configuration centralized around the gaming controller 106 in the system 100. In certain embodiments, the system 100 may be also be decentralized such that the gaming controller 106 does not manage communications between the devices of the system 100.

Figure 3:
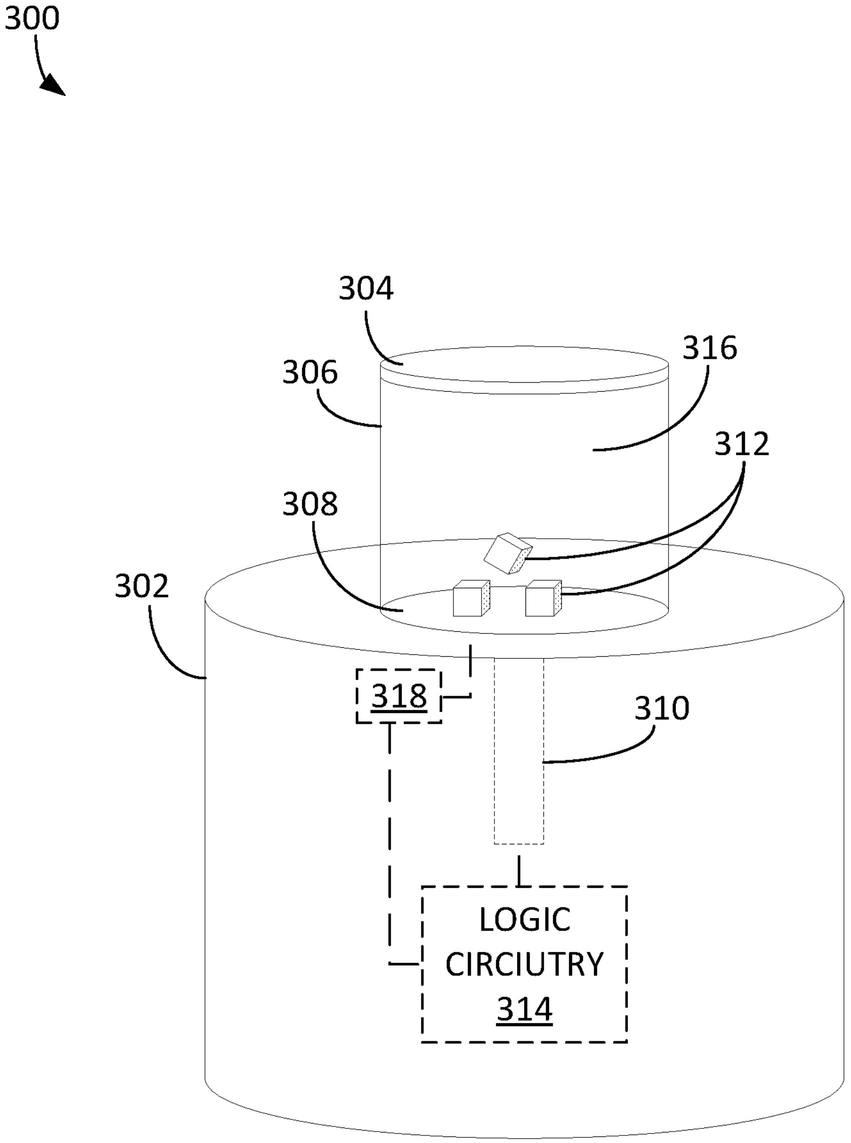
FIG. 3 is a perspective view of an example automated dice unit that may be used in the system shown in FIG. 1, according to one or more embodiments of the present disclosure.

FIG. 3 is a perspective view of an example ADU 300 that may be used in the systems shown in FIGS. 1 and 2. In the example embodiment, the ADU 300 includes a cabinet 302, a top 304, a display shell 306, a dice surface 308, a force mechanism 310, and one or more dice 312. In other embodiments, the ADU 300 may include additional, fewer, or alternative components, including those described elsewhere herein.

The cabinet 302 is configured to house one or more internal components of the ADU 300, such as the components of the ADU 102 as described in FIG. 1. In the example embodiment, the ADU 300 includes logic circuitry 314 stored within the cabinet 302 (in addition to the force mechanism 310 as described herein). The logic circuitry 314 includes one or more processors, memory devices, communication interfaces, and/or other suitable components to facilitate the functionality of the ADU 300 described herein. That is, the logic circuitry 314 may be configured to monitor and/or control components of the ADU 300 and communicate with one or more external devices (e.g., the gaming controller 106, shown in FIG. 1).

In the example embodiment, the top 304, the display shell 306, and the dice surface 308 are coupled together to define an internal cavity. This internal cavity may be referred to herein as a dice play area 316, where the dice 312 are contained within the dice play area 316. The display shell 306 enables players and bystanders to view within the dice play area 316 to observe the dice and the dice outcomes. The display shell 306 may be any suitable translucent or transparent material to facilitate viewing of the dice 312 while keep the dice 312 contained within the dice play area 316. For example, the display shell 306 may be formed from glass or acrylic. In certain embodiments, the display shell 306 may not be transparent or translucent, particularly for embodiments in which one or more cameras monitor the dice play area 316. The dice play area 316 may be viewable also through the top 304 in some embodiments, or the top 304 may be opaque. The top 304 may be removable from the display shell 306 to facilitate ease of access for technicians to the dice 312 and the dice play area 316. In some embodiments, the top 304 may house one or more cameras to monitor the dice play area 316 or include cutouts for external cameras to capture the dice play area 316. In certain embodiments, the ADU 300 may not include the top 304, but rather the display shell 306 may be configured to cover the dice play area 316 in place of the top 304. For example, the display shell 306 may be formed into a glass or acrylic dome over the dice play area 316.

The force mechanism 310 is coupled to the dice surface 308 to apply a force (directly or indirectly) to the dice 312, thereby causing the dice 312 to "roll" or "shake." In the example embodiment, the force mechanism 310 applies the force via a solenoid coupled to the dice surface 308. That is, as a current is applied to the solenoid, a plunger or armature of the solenoid moves along a vertical axis. Moving upwards applies an upward force on the dice surface 308 and, by extension, the dice 312. The logic circuitry 314 is configured to control the applied current to control the movement of the armature, thereby enabling the logic circuitry 314 to adjust the force applied to the dice 312. The parameters for controlling the applied force may be randomly determined, semi-randomly determined (e.g., a random selection of parameters from a table or set of predetermined parameters), or manually determined. For example, one or more players may submit player input to select one or more of the control parameters. In some embodiments, the player input may be compared to a lookup table of control parameters to select a control parameter associated with the player input (i.e., a layer of abstraction is provided between the player input and the control parameters). In other embodiments, the force mechanism 310 may have another suitable mechanism for apply a force to the dice 312, including other solenoid-based mechanisms.

In at least some embodiments, the outcome of the dice roll may be automatically determined. The dice outcome may be automatically determined by the ADU 300 and/or an external device (e.g., the gaming controller 106, shown in FIG. 1). In the example embodiment, the ADU 300 includes one or more RFID sensors 318 in communication with the logic circuitry 314, and each of the dice 312 include one or more RFID tags. The RFID sensor 318 may be integrated with the dice surface 308 or positioned near the dice surface 308, and the dice 312 may include an RFID tag for each face or side. The RFID sensor 318 may be configured to retrieve or receive data from the RFID tags in contact with the dice surface 308 (i.e., the downwards-facing sides). The RFID tags may store data to identify each die 312 from each other, the outcome of a dice roll (e.g., the indicia of the upwards-facing side of the dice 312), and/or other suitable characteristics of each die 312. In certain embodiments, the identity of each die 312 may be determined or verified based on the RFID sensor 318. For example, in embodiments with a plurality of RFID sensors 318 positioned around the dice surface 308, the identity of each die 312 may be determined or verified based on which RFID sensor 318 detected the respective die 312.

In addition to or in place of the RFID sensor 318, the ADU 300 may include a camera, or an external camera may be positioned and oriented to capture images and/or video streams of the dice play area 316. In embodiments with the cameras, the dice 312 may include visual characteristics that may be extracted from the pixels of a captured picture via image analysis. For example, each die 312 may be distinguished from one another by color, and the indicia on the dice 312 may be identifiable to determine a dice outcome. In another example, each die 312 may include optical coded identifiers (e.g., a barcode or QR code) that may be extracted and decoded from the captured image to identify the die 312 and/or the dice outcome. In certain embodiments, augmented reality (AR) visual characteristics may be applied to the dice 312 using the captured image or video stream, thereby enabling the visual characteristics of each die 312 to be adjusted or animated for the dice games. The AR characteristics may be applied by the ADU 300 or another device, such as the player terminal 104 or the gaming controller 106 shown in FIG. 1. It is to be understood that these AR characteristics are included within the visual indicia described herein for determining outcome values, identifying the dice, and/or other suitable determinations associated with the dice outcome.

Figure 4:
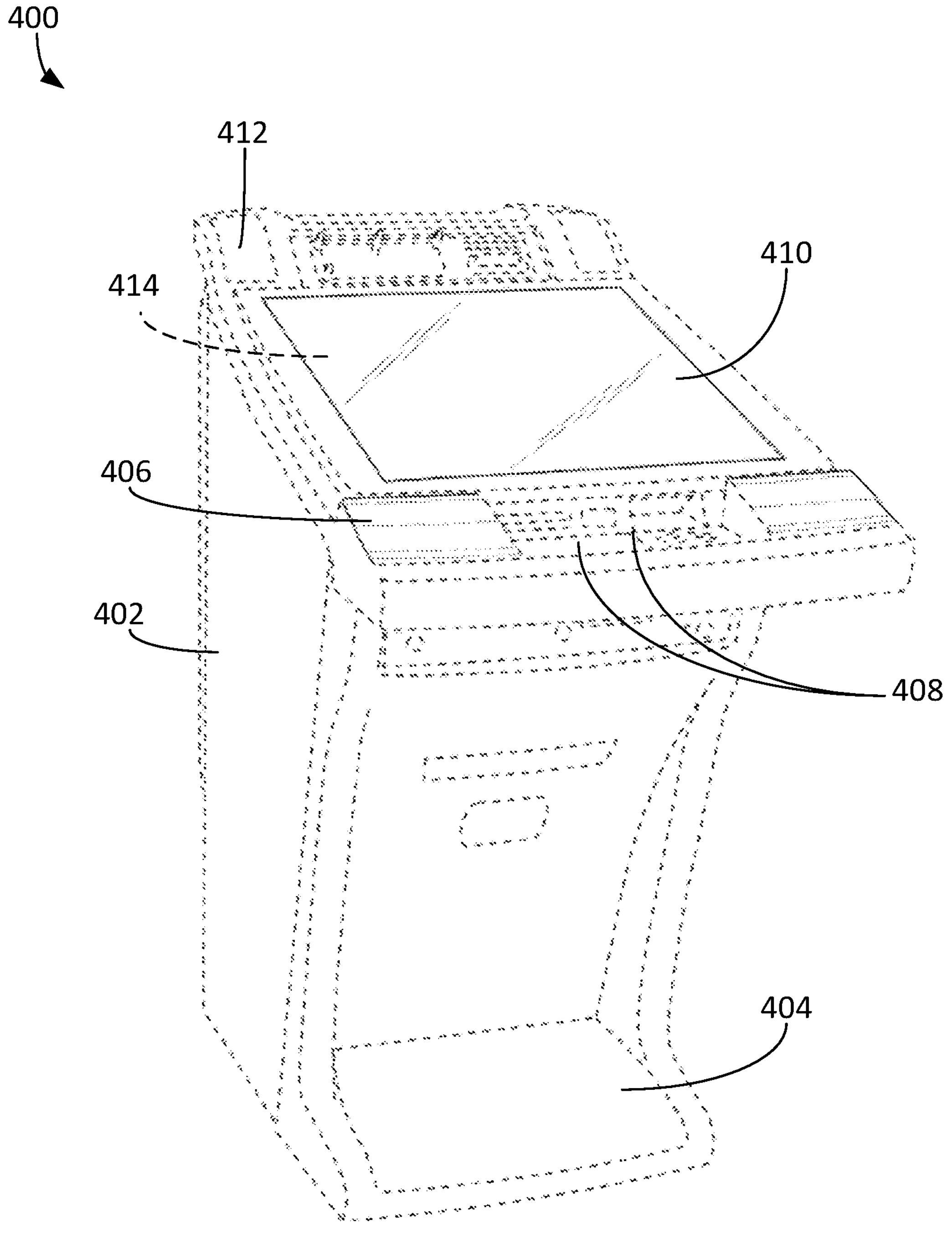
FIG. 4 is a perspective view of an example player terminal that may be used in the system shown in FIG. 1, according to one or more embodiments of the present disclosure.

FIG. 4 is a perspective view of an example player terminal 400 that may be used in a gaming system, such as the system 100 shown in FIG. 1. The player terminal 400 includes a cabinet 402, a footrest 404, an armrest 406, one or more credit input/output devices 408, a display 410, and a pair of opposing speakers 412. In other embodiments, the player terminal 400 may include additional, fewer, or alternative components, including those described elsewhere herein. An example internal architecture of the player terminal 400 is described herein in FIG. 10.

The height of the cabinet 402 may be configured for the player to stand or sit while playing. In the example embodiment, the cabinet 402 is configured for sitting play. The cabinet includes the footrest 404 and the armrest 406 for the player to position himself or herself comfortably at the player terminal 400. The cabinet 402 may be configured to be coupled (directly or indirectly through an adapter) to one or more other player terminals to form a bank of player terminals. For example, a bank of player terminals may be combined with one or more community display devices and/or ADUs for play of the dice games described herein.

The cabinet 402 may form one or more cavities for a plurality of internal components. The internal components may include logic circuitry similar to the logic circuitry of the ADU 300 (shown in FIG. 3) and/or other suitable internal components. The logic circuitry may include processors, memory devices, communication interfaces, and/or other components for interfacing with other components of the terminal 400 and other devices. The logic circuitry may be configured to cause the player terminal 400 to perform the functionality of the terminal 400 as described herein, which may include managing and/or presenting (e.g., via the display device 410) dice games.

The player terminal 400 includes one or more credit devices 408 for depositing and/or receiving physical items and/or data representing a credit or monetary value. For example, the credit devices 408 may include, and without limitation, a bill acceptor, a coin chute, a ticket reader, a ticket dispenser, a card reader, a barcode scanner, a camera (e.g., for scanning QR codes and the like), and/or other suitable sensors for detecting a credit input. The player may provide the physical credit input or a digital credit input (e.g., the player transmits a signal representing the credit input to the player terminal 400 from his or her phone) to the player terminal 400 (or another remote device, such as an accounting server) to establish a credit balance for the gaming session at the player terminal 400. Wagers during the gaming session may reduce the credit balance, and awards from the gaming session may be added to the credit balance. The player may add additional credits to the credit balance by providing an additional credit input. To retrieve the credit balance, the player may initiate a cashout procedure at the player terminal 400 to transfer any remaining credit to an account of the player, to a physical item representing the remaining credit (e.g., a ticket), or to any other suitable form of credit that may be retrievable by the player.

In the example embodiment, the player terminal 400 includes the display device 410 and the speakers 412 to present the dice games. In at least some embodiments, the player terminal 400 may include additional or alternative components for presenting the dice games. For example, the player terminal 400 may include emotive lighting, additional display devices, and the like. The display device may include a touchscreen 414 to enable the player to provide player input. The player input may be used, for example, to place wagers, select dice roll parameters, and/or other input suitable for the gaming session.

Figure 5:
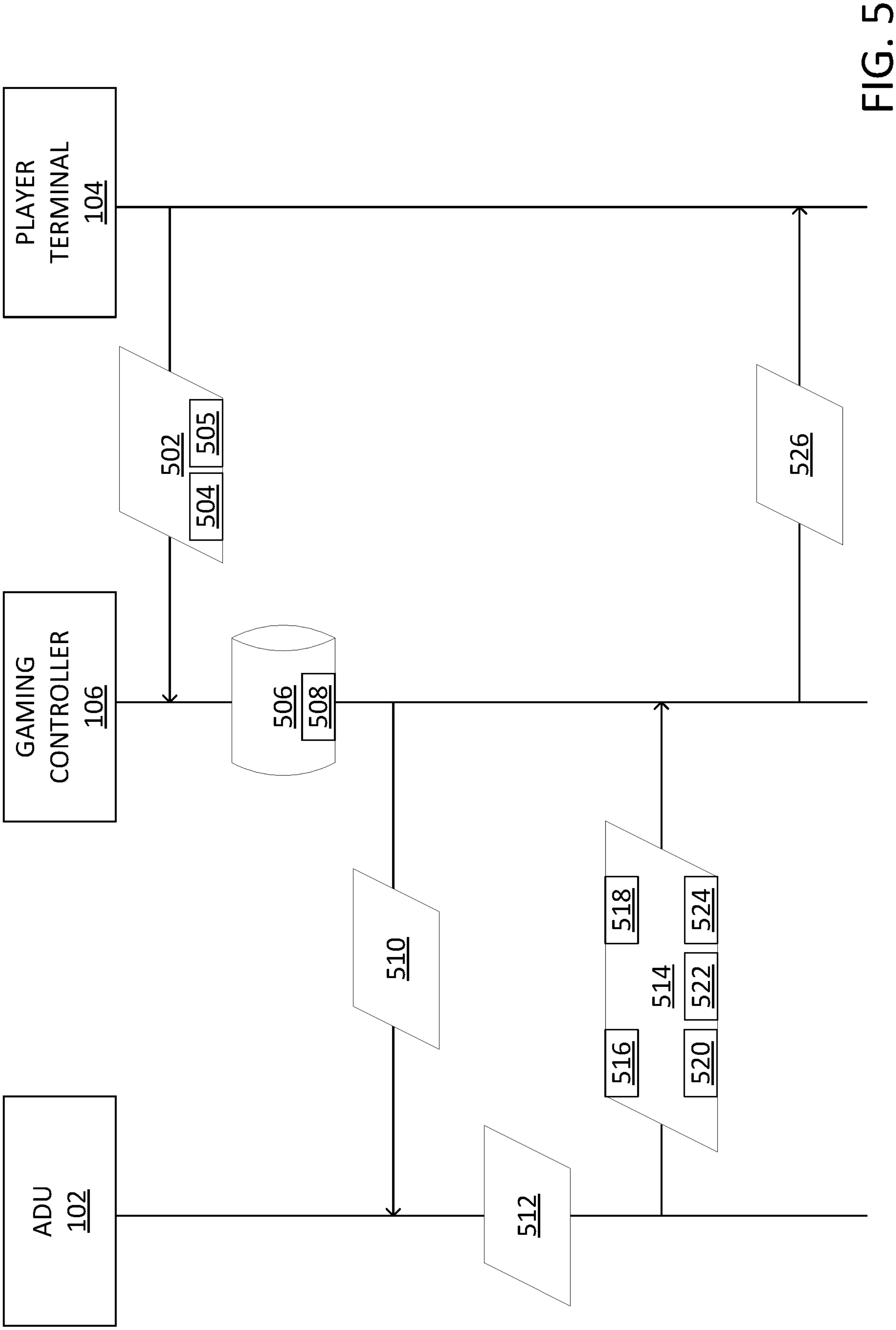
FIG. 5 is a data flow diagram of the system shown in FIG. 1 for conducting one or more dice games, according to one or more embodiments of the present disclosure.

FIG. 5 is a data flow diagram for data communication within the gaming system 100 shown in FIG. 1. Although the data generation and communication of FIG. 5 incorporates the system configuration of the system 100, it is to be understood that the data described herein may be communicated within a different system configuration. For example, the data communication may be adjusted in the system 200 (shown in FIG. 2) to account for the absence of the gaming controller 106 (or the gaming controller 106 being incorporated within the ADUs 102 and/or the player terminals 104). In other embodiments, additional, fewer, or alternative data elements may be generated and/or communicated, including those described elsewhere herein.

In the example embodiment, after a player establishes a gaming session at the player terminal 104 (e.g., provides credit input to establish a credit balance), the player terminal 104 may present the player with one or more prompts to provide player input 502 to enable the player to initiate his or her gaming session. For example, the player may be provided the option to select one or more dice games to play. The player may be given the choice of game, wager limits, virtual table or tournament, and/or other suitable game parameters. In certain embodiments, other games that do not incorporate the use of dice may also be played at the player terminal 104. The player may also select certain dice or certain ADUs 102 for play of the one or more selected games. In some embodiments, the player may provide input 502 to control (or partially control) the dice roll of the ADUs 102. The player input data 502 may include data for establishing the gaming session at the player terminal 104 and/or data associated with the wagers of the player. Such data may be used by the player terminal 104, the gaming controller 106, and/or another suitable device to manage and administer the active gaming sessions.

In the example embodiment, the player input data 502 is transmitted to the gaming controller 106. The transmitted player input data 502 may include all or some of the input received by the player terminal 104. That is, a portion of the received player input may be used by the gaming controller 106 while another portion of the input may be used by the player terminal 104. For example, the transmitted player input data 502 may include parameters for controlling the dice roll, while a portion of the player input data 502 associated with wagers may be stored by the player terminal 104 for managing the credit balance of the player.

The player input data 502 and other data described herein may include one or more terminal identifiers 504. The terminal identifier 504 is a unique identifier associated with a particular player terminal 104. The terminal identifier 504 (and/or other identifier described herein) may include a string or combination of alphanumeric, national, and/or special characters. In some embodiments, the terminal identifier 504 may not be stored as characters, but rather is a sequence of randomized bits in a suitable format for data transmission. The length or data size of the identifier 504 may be predefined (e.g., 20 characters) or dynamic. In certain embodiments, the terminal identifier 504 may be a network address of the player terminal 104, such as an internet protocol (IP) address. In some embodiments, the terminal identifier 504 is not a single string or data element, but rather is a combination of data elements (e.g., the network address and a unique character string). The terminal identifier 504 may be changed in response to manual intervention (e.g., a technician updates the identifier 504) or in response to automatic updates. For example, if the terminal identifier 504 is a network address, a network administrative device, such as a router, may assign a new address to the player terminal 104. The terminal identifier 504 may be used to track communications and activity (e.g., game events, wagers, etc.) associated with the corresponding player terminal 104. For example, the gaming controller 106 may filter communication of a game event to only the player terminals 104 participating in the corresponding game rather than all of the player terminals 104 based on the terminal identifiers 504 associated with the game.

In certain embodiments, the player input data 502 may include a player identifier 505 in addition to or in place of the terminal identifier 504. The player identifier 505 is associated with the player participating at the player terminal. The player identifier 505 may be text-based (e.g., a name or player account number), a unique bit string, a digital avatar, unique audio sequence, and/or biometric data, such as an image of the player or a fingerprint. In some embodiments, the player terminal 104 prompts the player to provide text, audio, images, and/or other suitable input to represent the player identifier 505. In other embodiments, the player identifier 505 may be retrieved from a player account or automatically generated. The player identifier 505 may be used to facilitate the use player terminals 104 configured to simultaneous use by multiple players. For example, one type of player terminal 104 may seat two players and enable the two players to simultaneously participate in respective dice games. The player identifier 505 enables the player terminal 104 to organize the presentation of the game interface for each player. The player identifier 505 may also be used to identify the player within community dice games. That is, the player identifier 505 may be distributed to other player terminals and/or the community display device 108 (shown in FIG. 1) as a representation of the player within the community game. In such communal games, the player terminal and/or the gaming controller 106 may be configured to obfuscate at least a portion of the player identifier 505 before transmitting the data to other devices. For example, the player terminal 104 may generate and transmit an alias and/or avatar based on the information provided by the player as the player identifier 505. In another example, the player may enter his or her name and provide a photo to be the player identifier 505. In such an example, the name of the player or the photo may not be transmitted to the gaming controller 106, but rather remains stored at the player terminal 104 for the gaming session.

In response to the player input data 502 from the player terminal 104, the gaming controller 106 may update the current state of the games managed by the gaming controller 106. That is, data is extracted from the received player input data 502 based on the predefined data structure of the player input data 502 and the extracted data is applied to the corresponding game states. In at least some embodiments, the gaming controller 106 may store a game state database 506 for tracking the various games associated with the player terminals 104. In other embodiments, the game state database 506 may be an external database from which the gaming controller 106 submits and retrieves data associated with the dice games. The database 506 may be a single, centralized database or a distributed database (i.e., a plurality of databases). In certain embodiments, such as embodiments in which a plurality of the player terminals 104 share the functionality of the gaming controller 106, copies of the database 506 may be stored by a plurality of devices to facilitate data comparison, verification, and the like. The game state database 506 may include a plurality of data fields for tracking different games and the players participating in each game. For example, for a particular game, the database 506 may include data fields for tracking the participating players (e.g., by including the terminal identifier 504 associated with the player and/or player account identifiers), the players' selections for the game (e.g., selecting dice, dice value, dice roll inputs, and the like for the next round of the game), rules, wagers, and/or other suitable data related to the game. In certain embodiments, the game state database 506 is configured to store dice outcome data as described herein in a game-agnostic format that can be parsed and analyzed for each game, thereby reducing the data storage burden on the gaming controller 106. By maintaining a database 506 for the games, the gaming controller 106 may be able to concurrently manage a plurality of games that are adaptable to the current players participating in the dice games of the system 100.

The game state database 506 may be configured to store historical dice outcome data and game state data (e.g., rounds of the game state data are stored) while facilitating players to establish new games. Establishing a new game may include generating a new data structure for the new game within the game state database 506 and concluding a game may result in the associated data structure being removed from the database 506 or moved to "inactive" storage. More specifically, the game state database 506 may be divided into data associated with "active" games and "inactive" games, where inactive games may have different data structures, data storage devices, and/or data manipulation rules (e.g., inactive game data may not be edited without manual permission). In other embodiments, the data of the inactive games may be stored in a different database. The data structure of each game may include a game identifier 508 similar to the terminal identifier 504. The game identifier 508 may be transmitted to the participating player terminals 104 to enable the player terminals 104 and the gaming controller 106 to identify which game is associated with data communicated between the devices. For example, the player input data 502 may include the game identifier 508 to enable the gaming controller 106 to apply the player input to the correct game. The combination of the terminal identifier 504 and the game identifier 508 may be particularly beneficial in embodiments in which the player may participate in a plurality of games simultaneously.

In certain embodiments, the gaming controller 106 may be configured to generate an "instance" or "object" for managing each active game or for managing a certain type of game, such as craps. These instances may be generated by allocating hardware and/or software assets of the gaming controller 106 (e.g., through virtualization or other suitable provisioning techniques) to manage the associated game or games, which may include retrieving configuration files or data associated with the games. The game state database 506 may be at least partially divided based on the active game instances. In one example, the dice outcome data described herein is stored and shared between the instances, but the game data is divided between the instances. If one instance is dedicated to craps games and another instance is dedicated to pai gow poker games, then the dice outcome data is shared between the two instances, but the pai gow poker instance does not receive or store game data relating to active craps games, and vice versa. The division of the database 506 may be indicated by the use of instance identifiers used to filter the data stored within the game state database 506. The instances of the gaming controller 106 may be configured to switch between active and inactive states or to be removed based on the currently active gaming sessions. In other embodiments, such as embodiments in which the player terminals 104 determine game outcomes, the gaming controller 106 may be configured to store and manage the dice outcome data and game outcome data without generating separate instances.

In at least some embodiments, the gaming controller 106 may generate and transmit ADU control data 510 to the ADUs 102 to provide at least partial control of the ADU operation. For example, the ADU control data 510 may include parameters for controlling the operation of the dice roll (e.g., parameters that affect the operation of the force mechanism 112 shown in FIG. 1). The control parameters may be extracted from the player input data 502 and added to the ADU control data 510 in embodiments where players can control the dice roll. In another example, the ADU control data 510 may include parameters for synchronizing the ADUs 102 together or into a predefined sequence. Other suitable control data may include, but is not limited to, controlling the operation of one or more image sensors of the ADUs 102 or controlling the emotive lighting of the ADUs 102 to present an emotive lighting sequence. The ADU control data 510 may be divided into a plurality of "control data elements" in a machine-readable format compatible with the ADUs 102 such that the ADUs 102 are configured to recognize and extract each control data element for the different uses described herein. The ADU control data 510 may be formatted by organizing the data elements into a predefined order established between the ADUs 102 and the gaming controller 106 and/or may include one or more headers or other identifying data to distinguish each control data element, thereby enabling the gaming controller 106 to omit certain control data elements as necessary when transmitting each instance of the ADU control data 510 to the ADUs 102.

The ADU control data 510 may be transmitted periodically (e.g., between each set of dice rolls) or variably. In one example of variable periods of transmission, the ADU control data 510 may be sent when the control parameters have been updated from the prior ADU control data 510. In another example of variable periods, one or more players may be provided the ability to at least partially control the dice roll, which may include mid-roll control of the roll through data communication during the dice roll. In other embodiments, the gaming controller 106 may not transmit ADU control data 510 periodically to operate the ADUs 102, but rather the ADUs 102 operate without requiring ongoing control data. For example, the ADU control data 510 may only be transmitted manually by an authorized administrator (e.g., while configuring the gaming system or providing maintenance to the ADUs 102) via the gaming controller 106 or another suitable device (including data storage devices directly coupled to the ADUs 102).

The ADUs 102 may be configured to synchronize with each other to facilitate dice rolls or outcomes at predetermined intervals. The ADUs 102 may be configured to synchronize such that every ADU 102 rolls the dice at substantially the same time (e.g., within five seconds of one another) or at designated intervals or delays. The synchronization between the ADUs 102 may be adjustable to facilitate a plurality of configurations of the dice outcomes. For example, synchronizing the ADUs 102 to generate dice outcomes at substantially the same time may be used in dice games with game outcomes involving more dice than the number of dice within one ADU 102. In another example, the ADUs 102 may be offset such that one of the ADUs 102 generates a dice outcome every fifteen seconds to facilitate a plurality of game outcomes at a predetermined pace of play. The ADUs 102 may be configured to generate dice outcomes in a sequential, predefined order or in a dynamic order that enables ADUs 102 to generate dice outcomes based on availability. In certain embodiments, the ADUs 102 may be configured to operate according to a plurality of synchronization schemes. That is, the synchronization schemes may be overlapping such that one or more dice outcomes are attributed to a plurality of synchronization schemes, or the synchronization schemes are interlaced such that the ADUs 102 synchronize to one scheme to generate one or more dice outcomes before synchronizing to a second scheme. In some embodiments, the ADUs 102 may not change synchronization schemes, but rather the gaming controller 106 may store the dice outcomes to generate game outcomes that may not suit the current synchronization scheme. For example, if a dice game requires dice outcomes from a plurality of ADUs 102 while the ADUs 102 are synchronized to generate dice outcomes one ADU 102 at a time, the gaming controller 106 may aggregate the dice outcome data from the ADUs 102 over time to generate the game outcome.

In certain embodiments, the ADUs 102 are configured to generate dice outcomes on-demand in addition to or in place of a synchronization scheme. That is, to reduce the mechanical wear on the ADUs 102 through unnecessary dice outcomes (i.e., no game outcomes are tied to the dice outcome), the ADUs 102 may await indication from the gaming controller 106 that one or more ADUs 102 are needed to generate dice outcomes. The gaming controller 106 may use the ADU control data 510 to activate the ADUs 102. The gaming controller 106 may request a single dice outcome or a plurality of dice outcomes according to a schedule. At the conclusion of the schedule, if no further dice outcomes are requested, the ADUs 102 may return to an idle state in which no dice outcomes are generated.

In at least some embodiments, the ADUs 102 are configured to track synchronization through ADU synchronization data 512. The synchronization data 512 may be communicated between the ADUs 102 to enable the ADUs 102 to operate according to a synchronization scheme while monitor each other for any dynamic changes between the ADUs 102 (e.g., one ADU 102 does not generate a dice outcome). The synchronization data 512 may be generated by one (e.g., a primary ADU 102 from which the remaining ADUs 102 sync) or more ADUs 102. The ADUs 102 may store at least a portion of the synchronization data 512 for subsequent use and/or for maintaining a historical record of the synchronization data, which may be beneficial for diagnostics, game recordation, and the like. The synchronization data 512 includes one or more data elements that indicate, but are not limited to, a timing sequence, the latest 'event', the status of each ADU 102, the order of ADUs 102, and/or other suitable data relating to the synchronization of the ADUs 102. The timing data within the synchronization data 512 may be a value of time compared to an internal clock or other time-keeping source of the ADU 102 to determine the timing and offset of each dice roll, or the timing data may itself contain the time-keeping source (e.g., the current date and time) as verified by at least a portion of the ADUs 102. The latest 'event' may indicate which ADU 102 last generated a dice outcome and/or if the last ADU 102 failed to generate an outcome. The last event data may be accompanied by a timestamp for determining the timing of the next dice outcome. The status of each ADU 102 may indicate whether each ADU 102 is active, inactive, requiring maintenance, which synchronization scheme is currently active at the ADU 102, and/or other states of the ADUs 102. The status of the ADUs 102 enables each ADU 102 to automatically and dynamically adjust to the current state of the other ADUs 102 (e.g., assigning a new primary ADU 102 if the current primary ADU 102 is inactive or requiring maintenance).

The synchronization data 512 may include external data, such as data from the ADU control data 510. For example, the gaming controller 106 may transmit parameters for controlling the synchronization scheme, the offset, the order of ADUs 102, and/or the primary ADU 102 within the control data 510. In some embodiments, the synchronization data 512 (or a portion of the data 512) may be transmitted to one or more devices other than the ADUs 102, such as the gaming controller 106 or the external systems 110. The synchronization data 512 may be used by the gaming controller 106, for example, to determine when each dice outcome is expected and to link these upcoming dice outcomes to certain game outcomes (or other aspects of the games). For example, in a dice game representing a card game, the game may require a dealer hand to be determined, and the gaming controller 106 may automatically assign certain dice outcomes to represent the dealer hand. In another example, the players may select certain dice irrespective of a particular ADU 102, and the gaming controller maps an upcoming dice outcome to a round of the game. That is, players may select dice having certain features (e.g., red dice, blue dice, etc.) present within all of the ADUs 102 rather than specific dice such that the gaming controller 106 links the upcoming dice outcome to the selections by the players. The external access to the synchronization data 512 may be through a single ADU 102 (e.g., the primary ADU 102) or a plurality of ADUs 102.

In the example embodiment, based on the synchronization data 512, the ADUs 102 generate dice outcome data 514 for each roll or dice outcome. More specifically, after the dice roll is completed (i.e., the dice have, after agitation by the ADU 102, come to rest), the ADU 102 is configured to identify an outcome value for each die associated with outcome indicia. In standard games, the upwards-facing die indicia of each die is part of the dice outcome, though other variations with different orientations of the outcome indicia (including a combination of orientations) are contemplated by the present disclosure. This identification of outcome values may be determined using data from one or more sensors associated with the ADU 102. For example, the ADU 102 may include one or more sensors configured to interact with the dice by accessing data stored by the dice, such as an RFID sensor accessing RFID tags embedded into (or beyond) each face of a die. The RFID tag embedded into the bottom face of the die may indicate the value of the upward-facing indicia of the die. Other data, such as a dice identifier, may also be retrieved from the RFID tags. In another example, one or more cameras are positioned and oriented to capture image or video data including the outcome indicia of the dice. The pixels (or another suitable subset) of image or video data are analyzed to detect the dice and extract the outcome values of each detected dice by translating the outcome indicia detected in the image or video data to the outcome values. In some embodiments, the ADU 102 translates the sensor data into the outcome values (or an intermediate data element), while in other embodiments, the ADU 102 may transfer the sensor data to an external device (e.g., the gaming controller 106) to extract the outcome values. For example, if the outcome value is based on an AR visual characteristic, the camera data may be transmitted to the gaming controller 106 to apply the AR overlay to the pixels of the camera data and to determine the outcome value based on the combination of the raw camera data and the AR overlay (which may be stored as a composite image or video).

In some embodiments, the dice outcome data 514 indicates the outcome value of the dice. The dice outcome data 514 may also include the dice identifiers to pair with a respective outcome value, thereby facilitating games where the dice within an ADU 102 may serve different roles in a dice game (including an inactive role). The dice outcome data 514 may include timestamps for distinguishing each round of dice outcome data 514 from previous and future rounds of the outcome data 514. In certain embodiments, other data elements may be used to distinguish between rounds of dice outcome data 514, such as round counter (which may be reset for each day or after a certain number of rounds or outcomes). The dice outcome data 514 may be generated by each ADU 102 and sent individually to the gaming controller 106 (and/or another suitable device) or aggregated together before transmitting. The dice outcome data 514 may include an ADU identifier to enable the gaming controller 106 to distinguish which outcome values are associated with which ADU 102. In at least some embodiments, certain data elements described herein may be combined together into a single data element. For example, the dice identifier and ADU identifier may be combined in a single string (e.g., "ADU1_Dice2") that can be parsed to extract the dice identifier and ADU identifier separately. Other suitable data associated with the outcome of the dice roll may be incorporated within the dice outcome data 514. Data elements within the dice outcome data 514 may be stored in a format that facilitates linking data elements, sorting data elements, extraction of data elements, and/or other suitable data management actions.

In the example embodiment, the dice outcome data 514 is transmitted to the gaming controller 106 from one or more of the ADUs 102. The dice outcome data 514 includes a plurality of outcome values 516 and a plurality of dice identifiers 518. Each die of a respective ADU 102 is associated with a respective outcome value 516 and dice identifier 518. The dice identifier 518 may be unique from all other dice within the system 100 (including dice housed by other ADUs 102), or the dice identifier 518 may distinguish between dice within a particular ADU 102 such that other identifiers within the dice outcome data 514 are combined with the dice identifier 518 to distinguish a particular die from dice of other ADUs 102. In at least some embodiments, the dice outcome data 514 includes one or more timestamps 520. Each timestamp 520 may indicate a time of the dice roll to differentiate between dice rolls or outcomes. In certain embodiments, the timestamp 520 is not a metric of time, but rather a counter according to a format predefined between the ADUs 102 and the gaming controller 106 (e.g., a round counter for a day).

The dice outcome data 514 may also include an ADU identifier 522 to indicate which ADU 102 is associated with a set of outcome values 516 and dice identifiers 518. In some embodiments, such as embodiments in which ADUs 102 separately communicate dice outcome data 514 to the gaming controller 106, the timestamp 520 and/or the ADU identifier 522 is stored in a header of the dice outcome data 514. In other embodiments, each outcome value 516 and dice identifier 518 is stored with a respective timestamp 520 and/or ADU identifier 522, such as embodiments in which the dice outcome data 514 includes data from a plurality of the ADUs 102.

In certain embodiments, the dice outcome data 514 may include sensor data 524 from the sensors of the ADUs 102. The sensor data 524 may include, for example, image or video data of the dice or the raw data retrieved by the RFID reader of the ADU 102. The sensor data 524 may be transmitted in place of the outcome values 516 (i.e., devices other than the ADUs 102 determine the outcome values 516) or in addition to the outcome values 516. The addition of the sensor data 524 may be used, for example, to monitor the operation of the ADUs 102 or to provide additional presentation options for the dice games, such as a live video feed of the dice. In some embodiments, the sensor data 524 is not part of the dice outcome data 514, but rather is transmitted as a separate data stream (e.g., a dedicated video stream).

In certain embodiments, the gaming controller 106 is configured to determine or translate into a predetermined format at least a portion of the dice outcome data 514 based on the data transmitted by the ADUs 102. For example, the outcome values and dice identifiers may be extracted from the sensor data 524. In another example, the format of the dice outcome data 514 may be translated to a format suitable for storage in the game state database 506.

In response to receiving the dice outcome data 514, the gaming controller 106 may determine the game outcomes based on the outcome values of the dice outcome data 514 and the current game parameters stored in the game state database 506. It is to be understood that the gaming controller 106 may determine game outcomes as the dice outcome data 514 comes from each ADU 102 or upon receiving sufficient dice outcome data 514 to generate a game outcome. The player input data 502 defined the initiation of a dice game round (e.g., wagers placed, player selections of certain dice, etc.), and the dice outcome data 514 is translated into the outcome of the dice game round. The gaming controller 106 stores the data elements of the dice outcome data 514 in the game state database 506 such that, for each active game, the gaming controller 106 may perform a lookup of the dice outcome data 514 to retrieve the relevant outcome values.

In at least some embodiments, the player input data 502 and/or game data generated by the gaming controller 106 may be compared to the dice outcome data 514 to determine the game outcomes. For example, the player may select certain dice for a round of a dice game. This selection is passed to the gaming controller 106 as outcome values, dice identifiers, and/or ADU identifiers within the player input data 502. These identifiers are then stored by the gaming controller 106 in the game state database 506 for resolving the round. In response to dice outcome data 514, the outcome values of the dice outcome data 514 that are associated with the dice and/or ADU identifiers stored by the gaming controller 106 are compared to the stored outcome values or predefined outcome values according to the rules and parameters of the game. Based on this comparison, one or more outcomes of the dice game are determined to identify any winning game outcomes and to resolve the outstanding wagers for the round. In other embodiments, the game outcomes are determined through other suitable comparisons, functions, and/or methods of outcome determination based on the format of the data described above and the rules or parameters of the dice game. In one example, other elements external to the dice may be included in determining the outcome of the game, such as a reel-based game feature on the player terminal 104 or an ongoing bingo game.

In the example embodiment, the gaming controller 106 generates game outcome data 526 based at least partially on the player input data 502 and the dice outcome data 514 from one or more ADUs 102. The game outcome data 526 may include data elements indicating the outcome values of the dice, the result of each wager on the current round of a dice game, and/or other game events to be conveyed to the player terminals 104 and/or other devices, such as an accounting system for resolving awards based on the current round of a dice game. The gaming controller 106 is configured to convert or translated the dice outcomes into game events or outcomes according to the format and guidelines of the respective game. In some embodiments, the game outcome data 526 may include presentation elements (e.g., video streams, images, emotive lighting sequences, audio streams, etc.) for presentation by the player terminals 104 and/or other devices. The presentation elements may, in certain embodiments, be generated and transmitted separately from the other game outcome data 526.

The gaming controller 106 may not generate game outcome data 526 for every active game in at least some embodiments, but rather the player terminals 104 may generate the game outcome data 526 based on the dice outcome data 514 from the ADUs 102 or the gaming controller 106. For example, one player terminal 104 may be configured to generate game outcome data 526 for a single player game, while the gaming controller 106 may generate game outcome data 526 for communal or multiplayer games. In certain embodiments, the gaming controller 106 does not generate game outcome data 526 such that multiplayer games are conducted through one or more player terminals 104 to generate the game outcome data 526. In such embodiments, the dice outcome data 514 may be passed on through the gaming controller 106 to the player terminal 104 or the ADUs 102 may communicate the dice outcome data 514 directly to the player terminals 104. In embodiments in which each of the player terminals 104 include a respective gaming controller 106, the ADUs 102 communicate the dice outcome data 514 with the player terminals 104 to generate the game outcome data 526. For community games, one or more player terminals 104 may be manage the community game such that the managing player terminal 104 transmits the game outcome data 526 to other participating player terminals 104.

For each game or device, the data within the game outcome data 526 may vary based on, but not limited to, whether the end client is a 'thick' client or 'thin' client, the rules of the game, and whether or not the game is communal (i.e., involving other player terminals 104). For example, for thin clients, the gaming controller 106 may be configured to determine the game-logic by determining the game outcome, resolving wagers, and providing presentation elements based on the game outcome for presentation by the thin client. For thick clients, the gaming controller 106 may extract and transmit the relevant data from the dice outcome data 514 to the thick client to enable the thick client to determine the game outcome and generate presentation elements associated with the determined game outcome. For communal games where each player has a different outcome based on their initial wagers and selections in the player input data 502, the gaming controller 106 may transmit data associated with every outcome in the communal game to each player terminal 104 to facilitate an experience similar to a traditional, physical table game (i.e., every outcome is viewable by the players at the table).

In some embodiments, the game outcome data 526 is transmitted to the player terminals 104 for determining the game outcome and/or to present the game outcome to the players. The game outcome data 526 may be sent to the player terminals 104 on a per-game basis such that the outcome data 526 is transmitted separately for each game or on a per-terminal basis such that game outcome data 526 for multiple games including a give player terminal 104 may be combined for transmission to the player terminal 104. Transmitting the game outcome data 526 on a per-terminal basis may also be used in embodiments in which the game-logic is performed at the player terminal 104 and the game outcome data 526 include data directly from the dice outcome data 514 for the player terminal to parse and determine game outcomes for one or more games. The game outcome data 526 may include one or more game identifier 508 to enable the player terminal 104 to distinguish which game is associated with the game outcome data 526. In certain embodiments, the game outcome data 526 may include a plurality of outcomes for one game. For example, if a particular dice game only requires dice from one ADU 102 to determine a round, multiple outcome values from synchronized ADUs 102 may be used to determine a plurality of rounds (or determine a plurality of a least partially random events in a round) for the dice game at once.

In certain embodiments, the gaming controller 106 operates as a data repository of the dice outcome data 514, which may be stored within the game state database 506, and the player terminals 104 are configured to query the gaming controller 106 for the dice outcome data 514 relevant to a given player terminal 104. This may be beneficial, for example, in embodiments in which the game-logic for at least a portion of the games is local to each player terminal 104. For example, dice games played by an individual player alone may be determined by the game-logic of the corresponding player terminal 104. In another example, communal games may be conducted through a peer-to-peer network of the player terminals 104. In such embodiments, the gaming controller 106 may not receive player input data 502, but rather the player terminals 104 store the player input data 502 to resolve the dice games. The player terminals 104 may transmit the game outcome data 526 to the gaming controller 106 for storage within the game state database 506. The system 100 may be adaptable to facilitate various configurations between the player terminal 104 and the gaming controller 106 concurrently based on the type of dice game, the particular player terminal 104, the player input, and/or other parameters of the system 100.

In the example embodiment, the player terminals 104 are configured to receive the game outcome data 526 (or the dice outcome data 514 to generate the game outcome data 526) and present the player with the associated one or more outcomes. For example, the sensor data 524 may be received by the player terminal 104 to provide a video feed of the dice within at least one of the ADUs 102, which may be beneficial for players with vision difficulties and/or player terminals 104 located at a position with limited or no line of sight to the ADUs 102 (or the community display device 108). The player terminal 104 is configured to retrieve presentation data associated with the game outcome from the game outcome data 526, from local data storage, and/or other data storage devices. The presentation data may include, for example, graphical elements (e.g., symbols, animations, game interfaces, etc.), audio files, emotive lighting control data, control data for other presentation devices (e.g., vibration motors, motors for moving mechanical reels, etc.), and/or other suitable data for engaging the player. For example, if a winning outcome is detected from the game outcome data 526, the player terminal 104 may retrieve presentation data to present an animation associated with the winning outcome on the display of the player terminal 104. It is to be understood that although the presentation data is described above as associated with a game outcome, the presentation data is not limited to game outcomes. That is, the presentation data may be associated with other stages of the dice game, additional information (e.g., the credit balance of the player, advertisements, etc.), attraction modes, and the like.

In the example embodiment, at least a portion of the data flow shown in FIG. 5 is repeated during an active gaming session at a player terminal 104. For example, the data flow may be repeated for each round or game cycle of the games in which the player is currently participating. The ADUs 102 and the gaming controller 106 are configured to adapt to the number of active player terminals 104 and the types of games presented at the player terminals 104. As a result, players can participate in a variety of games concurrently and to his or her current gaming desires without requiring a relatively large number of gaming tables be deployed in the gaming environment. As the system 100 may be used to generate outcomes for a plurality of concurrent games according to various game parameters, the complexities of administering such a wide variety of games using physical gaming tables may reduce the available floor space in the gaming environment for other gaming machines, devices, pathways, and the like. Additionally, at least some gaming tables are not universally sized for all games, require additional gameplay devices, and/or include markings or indicia on a play surface specific to a certain game or game parameters (e.g., the minimum wager amount) that are not easily adapted between games. Moreover, the use of physical dice as a random outcome generator may be beneficial in attracting certain players to participate and may decrease the computational burden on the gaming controller 106 to generate the outcome values through algorithm-based random number generation.

Figure 6:
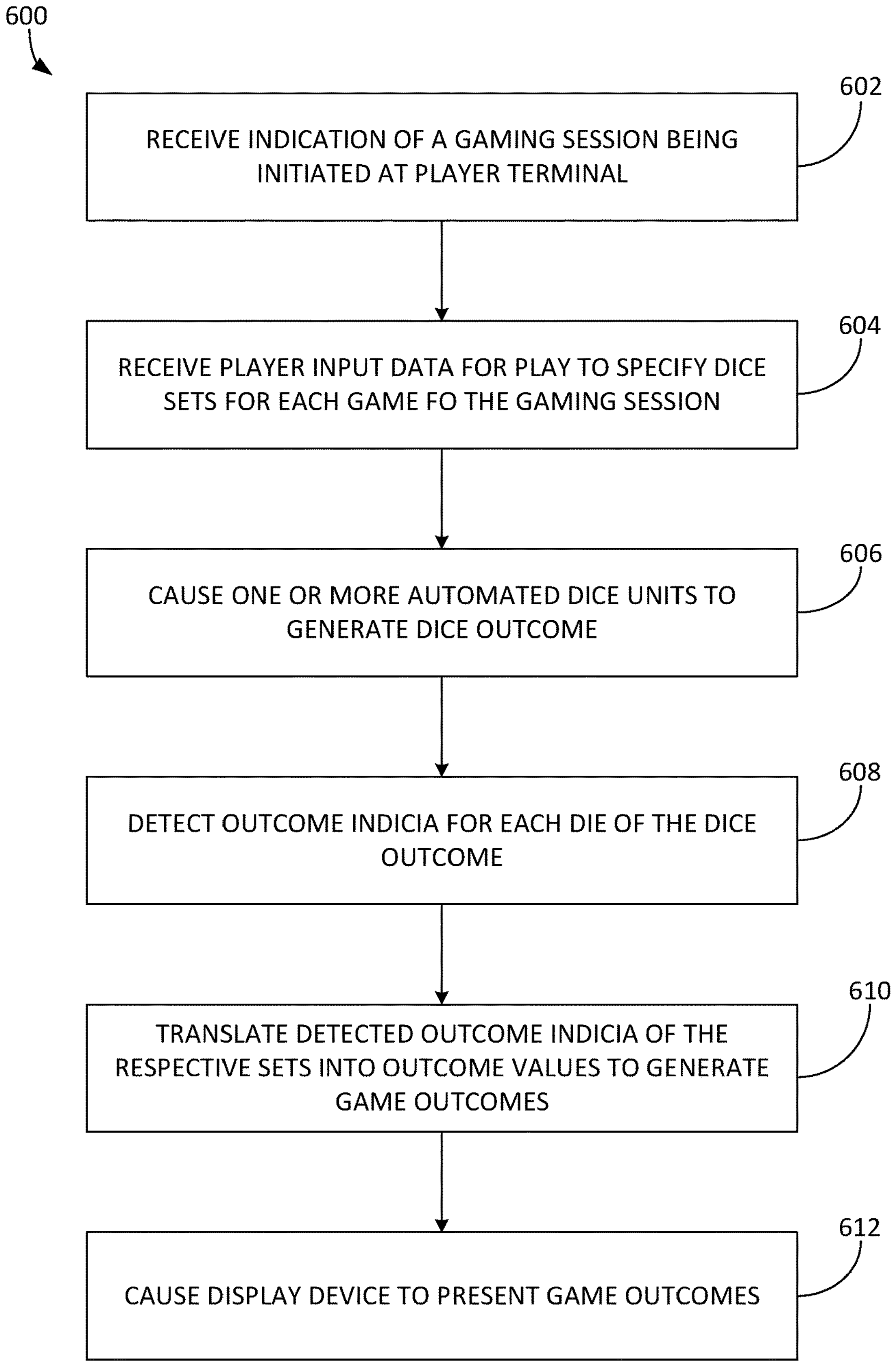
FIG. 6 is a flow diagram of an example method for conducting a plurality of dice games use a gaming system, such as the system shown in FIG. 1, according to one or more embodiments of the present disclosure.

FIG. 6 is a flow diagram of an example method 600 for conducting a plurality of dice games using the system 100 shown in FIG. 1. The method 600 is described herein with one player terminal 104 configured to participate in a plurality of games concurrently. However, it is to be understood that the method 600 may be performed using a plurality of terminals 104 participating in a plurality of games. To facilitate data communication with a plurality of player terminals 104, the data transmitted within the method 600 may include one or more identifiers associated with the player terminals 104, such as the terminal identifier 504 shown in FIG. 5. In the example embodiment, the method 600 is at least partially performed by the ADUs 102 and/or the gaming controller 106. In other embodiments, the method 600 may include additional, fewer, or alternative steps and/or is at least partially performed by another device, including those steps and/or devices described herein. In certain embodiments, such as embodiments without a gaming controller 106 similar to the system 200 shown in FIG. 2, at least some steps of the method 600 may be performed by the player terminal 104.

With respect to FIGS. 1 and 6, at step 602, the gaming controller 106 receives indication of a gaming session being initiated at the player terminal 104. The gaming session may be initiated, for example, by receiving a credit input from a player, linking a player account or financial account to the player terminal, or otherwise receiving player input at the player terminal 104. The player may be provided with one or more selectable options while initiating the gaming session. For example, a plurality of games may be available for the player to choose to play. The games may include active games (i.e., games already with in progress with other players) and/or games that are established in response to selection by the player. The player may browse the available games using the player terminal 104 and select one or more games, thereby enabling the player to participate in several concurrent games. Selection may not be limited to just the type of game, but rather the player may filter active games or establish new games according to one or more parameters. These parameters may include, but are not limited to, wager amount, round frequency, public or private games, player location (e.g., at a specific gaming environment or lobby), device type, and the like. Through these parameters, the player is provided with a level of customization that may not otherwise be available in traditional table games.

The indication received 602 by the gaming controller 106 may indicate which games the player is participating. The gaming controller 106 updates the game state database 506 (shown in FIG. 5) to include the player in the active games and to establish any new games, which may be joined by other players depending upon the type of game and the parameters set by the player. The indication received 602 by the gaming controller 106 may include identifiers for facilitating subsequent communication. More specifically, a terminal identifier associated with the player terminal 104 and one or more game identifiers associated with the selected games are exchanged. In the example embodiment, the gaming session may include the player participating in two dice games concurrently. In other embodiments, the player may participate in a different number of games (including one).

To begin play of the selected games, the player terminal 104 may prompt the player to provide player input. The player input may include, for example, selection of a particular ADU 102, selection of a set of dice, dice control parameters, a wager amount, and/or other suitable input associated with the dice games. The player may provide input for each game separately or in combination. In one example, a game interface on the player terminal 104 includes dedicated windows or tiles for each game, where player input or selections within a particular window are applied to the associated game. In another example, the game interface may be toggled between different games, where at least one game is focused on the display interface while the remaining games are presented in a minimized or unfocused manner. Other suitable presentations and input devices may be used to prompt the player to provide player input.

In the example embodiment, the player input includes a selection of a set of respective dice for each of the two active games. The dice may be selected from any of the ADUs 102 or a subset of the ADUs 102 based on the parameters of the game and/or the timing of the dice outcomes. For example, the selection of dice may be limited to the next ADU 102 configured to generate a dice outcome. Selection of the dice may include selecting the ADU 102, selecting dice of a particular visual characteristic (e.g., a color of the dice), and/or selecting certain dice within an ADU 102. In certain embodiments, the selection of the dice is not prior to a round, but rather is after one or more dice outcomes have been generated. For example, in a poker dice game, the dice outcomes may be staggered (e.g., hole, flop, turn, and river) to facilitate additional wagers and/or other player decisions, such as selecting new dice. In at least some embodiments, the selection of dice may be common between a plurality of games or at least partially different. That is, sets of dice may completely overlap, partially overlap, or be completely separate sets of dice. The sets of dice may have any suitable number of dice (including one) for play of the respective games. In certain embodiments, the player may select multiple sets of dice for a single game.

In some embodiments, the player may be prompted to provide other selections for each game. In one example, in addition to selecting certain dice from the ADUs 102 for play of a game, the player is prompted to configure other aspects of a game. For a slot-based game, the player may be prompted to map dice of the ADUs 102 to symbol positions within a symbol array such that the outcome values of the selected dice are applied to the mapped symbol positions (as symbols, modifiers, awards, etc.). For a dice game associated with a card game that includes discards and holding cards represented by the dice, the player may select certain "cards" to hold such that the unselected cards are "redrawn" (i.e., subsequent dice outcome(s) represent to newly drawn cards). For a competition-based game, such as a dice game representing a horse race, the player may select one or more horses to be represented by the dice, where the dice outcomes represent the performance of the selected horses for the race or a leg of the race. In certain embodiments, at least some of the dice may be selected to be modifiers for a game outcome (which may be based on other dice or based on a non-dice game outcome). In one example, the player may provide a secondary wager associated with a particular dice outcome of one or more die to gain a secondary award, modify an award of the game, and/or modify game elements. In another example, no secondary wager is required, and the particular dice outcome may be detected from the dice sets selected by the player or from dice at least partially external to the selected sets (e.g., one ADU 102 may be configured to generate dice outcomes dedicated to modifiers for at least one game). These selections may be included within the player input data for the gaming control 106 or the selections may be stored by the player terminal 104 for generating and/or presenting a game outcome as described herein.

In the example embodiment, the player terminal 104 transmits the player input data to the gaming controller 106. At step 604, the gaming controller 106 receives the player input data and updates the game state database 506 based on the received player input data. In one example, the gaming controller 106 extracts the player selection of dice and/or ADU, the wager of the player, and/or other suitable data that affects the game state. In embodiments that enable the players to provide input to control or at least partially control the operation of the ADUs 102, the control input is extracted from the player input data to be sent to the ADUs 102 (e.g., via the ADU control data 510, shown in FIG. 5). The gaming controller 106 is configured to convert or translate the player input data for controlling the ADUs 102 (or other data elements to be sent to the ADUs 102) into a machine-readable format compatible with the ADUs 102. The conversion or translation may be based on one or more conversion table, function, and/or other suitable conversion methods to change the player input data elements from an abstracted form suitable for players to understand into a format accepted by the ADUs 102.

At step 606, the gaming controller 106 causes the ADUs 102 to generate one or more dice outcomes. It is to be understood that step 606 is not necessarily limited to the ADUs 102 generating outcomes responsive to the gaming controller 106, but rather the gaming controller 106 may associate specific automated dice outcomes with the game outcomes described herein. For example, after receiving the player input data 502, the gaming controller 106 may associate the next dice outcome data from the ADUs 102 with the player input data 502 to resolve one or more game outcomes.

At step 608, the gaming controller 106 detects outcome indicia for each die of the dice outcome. In some embodiments, the outcome indicia is detected using sensors associated with the ADUs 102 (e.g., sensors 318). In other embodiments, images, video, and/or other data is transmitted to the gaming controller 106 to extract the outcome indicia and to distinguish each die from each other. At step 610, the gaming controller 106 (and/or the ADUs 102) translates the outcome indicia into outcome values for use in determining game outcomes. For example, the outcome indicia of a standard six-sided die is represented by a number of grooves or indents on each side. Translating the indicia to an outcome value may be performed through a lookup table, where each indicia is linked to a particular outcome value. In other embodiments, other suitable means for translating indicia into outcome values may be used, such as reading coded identifiers from the outcome indicia.

In the example embodiment, the gaming controller 106 resolves one or more game outcomes by applying the outcome values to the state of each game indicated by the game state database 506 based on game parameters specifying the rules and format of each game. That is, one set of outcome values may result in a losing outcome in one game and a winning outcome in another game based on the different rules and parameters of the two games. Each game outcome may be based on a single set of dice (which may be selected by the player via the player input data 502), or the game outcomes may incorporate outcome values from several sets of dice. In one example, players may compete with one another by selecting respective dice sets and comparing the respective outcome values to determine a game outcome. In another example, players may be provided the option to select multiple dice sets for a game round, where the outcome values of each dice set may determine separate game outcomes or be combined to generate one game outcome.

The game state database 506 may be updated in response to determining the game outcomes, and wagers associated with the game outcomes are resolved. That is, winning outcomes may result in award applied to a credit balance of the player based on the wager of the player and the game outcome, and wagers for losing outcomes may be at least partially collected and/or distributed to winning players. While updating the game state database 506 and resolving wagers may be performed immediately following the determination of the game outcomes, these changes may be presented to the player in a game outcome sequence.

At step 612, the gaming controller 106 causes one or more display devices to present the determined game outcomes. In the example embodiment, the display device of the player terminal 104 presents in the game outcomes in combination with other presentation elements of the player terminal 104 (e.g., speakers and emotive lighting). The presentation of the game outcomes may be configurable to facilitate a plurality of suitable manners for the player to identify the one or more game outcomes. For a single game outcome, the display device may be primarily dedicated to presenting a game interface for the game, and the game outcome may be presented within the game interface.

For players participating in multiple games at once, the player may be provided the option to split the display device into a plurality of game interfaces and/or to switch focus between the different game interfaces. In such embodiments, the presentation of the game outcomes may be simultaneous, sequential, staggered, and/or through other suitable presentation sequences. In one example, the game outcome for the game having a focused game interface is immediately presented, and the game outcomes the remaining games are presented in response to player input selecting one of the remaining games. In another example, games in a minimized or unfocused view on the display device may be configured to provide different outcome presentations in comparison to games in the focused view. In such an example, the game outcomes may be identified without presenting the entire game interface, and winning outcomes may be replayed in response to selecting the corresponding game to be focused.

Presenting the game outcomes may include presenting changes to the state of the game and presenting a wager resolution sequence. The wager resolution sequence may include collecting wagers for non-winning game outcomes and providing an award sequence for winning outcomes, where awards are visually applied to a credit balance of the player. Following the presentation of the game outcomes, the player may be provided the option to continue the gaming session by participating in one or more subsequent rounds. As a result, steps 604-612 may be repeated for each round, and the player may be provided the option to selectively enter new games and exit current games throughout the gaming session. To exit a current game, the player may initiate a ‘cashout’ sequence, where the current value of the credit balance of the player is provided to the player via suitable physical items (tickets, currency, etc.) and/or suitable digital means (e.g., the credit balance is applied to a digital wallet or player account associated with the player).

An example is provided herein with respect to the steps of the method 600. In this example, a player initiates a gaming session at a player terminal. More specifically, the player initiates or enters a first game and a second game. The first and second games may be the same type of game (e.g., a craps game) or different types of games, such as a craps game and a ‘slot-style’ game, where dice outcomes populate a symbol array. For each game, the player is prompted to provide input to place wagers, select game parameters, control dice rolls, and/or other elements of the game. For a craps game, the player may place wagers relating to dice rolls of a shooter, which may or may not be the player. In other games, the player may select certain dice from a plurality of available dice to play a round or series of rounds of the dice game. The player input is stored within one or more game state databases tracking the current state of each active game to await one or more dice outcomes to resolve the game states.

The ADUs may generate the dice outcomes by shaking, rolling, or otherwise moving the dice automatically or semiautomatically (e.g., players provide input to control the dice shakers). The dice outcomes are detected through one or more sensors that identify indicia or another feature of the dice representing an outcome value. The outcome indicia are then translated into outcome values and dice identifiers (by the ADUs, a gaming controller, and/or the player terminal) for use in the active games. That is, the translated output from the dice outcomes is extracted for each game and compared to the current state of the game to determine one or more game outcomes. For example, a particular die having an outcome value of four may result in a different game outcome for different games, thereby enabling a plurality of different games to active concurrently. As a result, the first game has a first game outcome, and the second game has a second game outcome that may rely upon the same dice parameters or different dice parameters (e.g., different dice sets, different dice outcomes from the ADUs, different order of dice, etc.). The first and second game outcomes are then presented at the player terminal to the player together or separately.

In at least some embodiments, the systems and methods described herein facilitate player control of the dice rolls at the ADUs 102. More specifically, players may be prompted to provide input representing control data for the ADU 102 that affect the force applied to roll the dice. The control data may affect, for example and without limitation, the duration of the roll, the type of force applied, a shoot event, the initiation of a dice roll, and/or the conclusion of a dice roll. A shoot event is a mid-roll change or adjustment to the force applied to the dice, which may be similar to a player rolling dice in a craps game (i.e., the shooter). That is, a shooter in craps may pick up a set of dice, shake the dice within his or her hand, and then throw or roll the dice across a play area of the craps game, which may be considered a shoot event in this context. It is to be understood that shoot events associated with the ADU 102 are not limited to emulating a shooter in a craps game, but rather a plurality of various combinations of suitable forces may be applied based on the dice game and/or player input.

Figure 7:
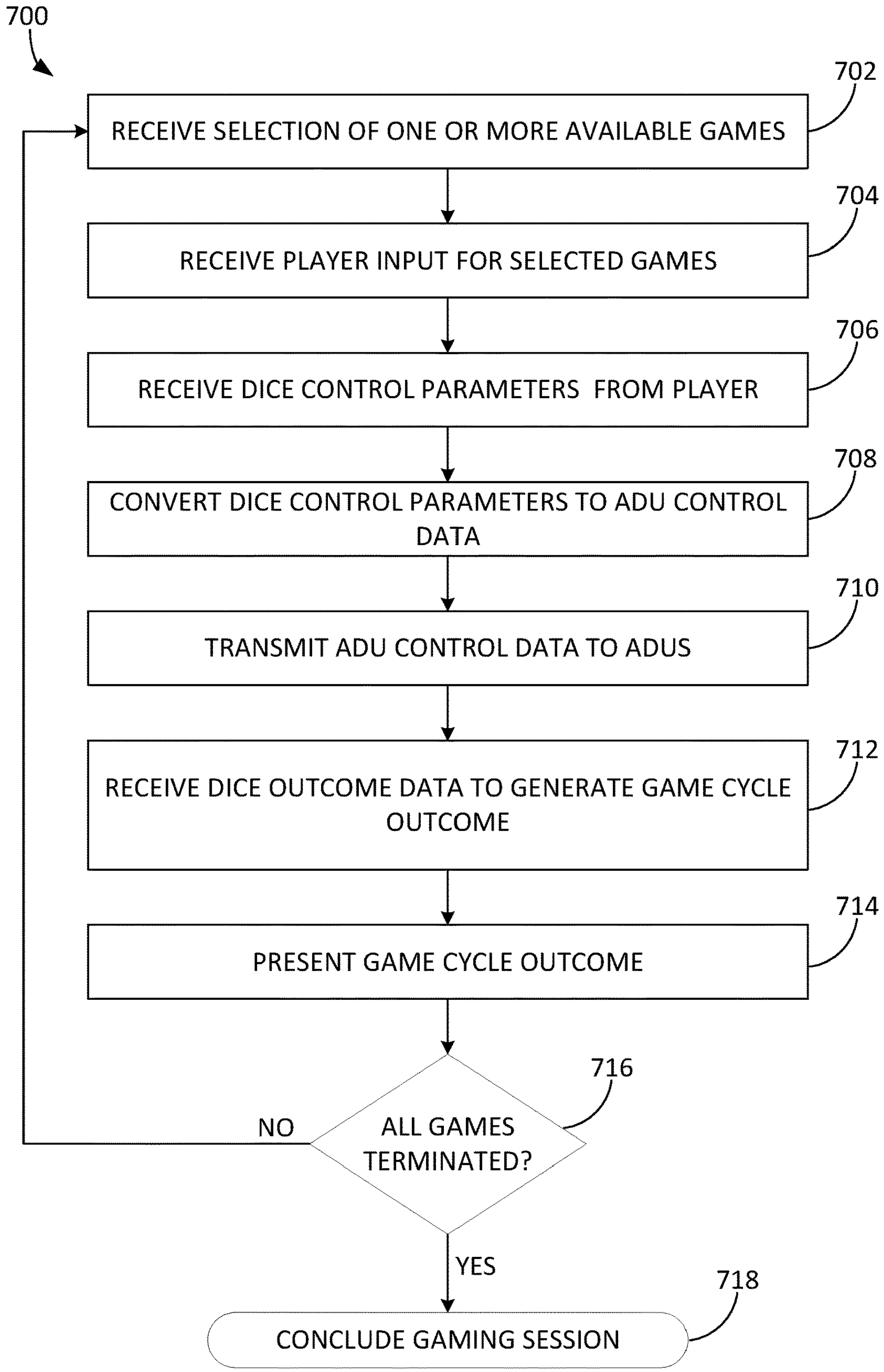
FIG. 7 is a flow diagram of an example method for providing player control of a dice roll of an automated dice unit using a gaming system, according to one or more embodiments of the present disclosure.

FIG. 7 is a flow diagram of an example method 700 for providing player control to one or more ADUs using a gaming system, such as the systems 100 and 200 (shown in FIGS. 1 and 2, respectively). More specifically, the method 700 provides players at least partial control of generating dice outcomes through the ADUs. As the ADUs may be physically separated from the terminals at which the players participate within the dice games, the player control may provide players enhanced engagement with the dice rolls or outcomes. The method 700 may be performed using one or more devices of the gaming system, such as one or more player terminals, gaming controllers, and/or ADUs. The gaming controller may be integrated within a player terminal and/or ADU in certain embodiments. In the example embodiment, the method 700 is performed by a player terminal and a gaming controller (which may be integrated with the player terminal in certain embodiments). In other embodiments, the method 700 may be performed by another suitable device or combination of devices and/or include additional, fewer, or alternative steps, including the steps described elsewhere herein.

At step 702, a player at a player terminal initiates a gaming session by selecting one or more games to participate in. The selection may include initiating a new game and/or joining a preexisting game, which may be a prior persistent game or a multiplayer game. The game interface presented by the player terminal may be adjusted to accommodate the selections by the player. The player selections and other player input described herein may be prompted by the player terminal via one or more input and output devices of the player terminal. In one example, the display and the corresponding touchscreen of the player terminal are configured to present various buttons, sliders, and/or other input elements to prompt the player for player input.

At step 704, the player is prompted to provide player input for at least one of the selected games. More specifically, the player is prompted to provide input regarding wagers, dice selection, other game element selections, and/or dice control parameters for one or more ADUs. The player input data prompts may vary based on the structure of the underlying game. That is, the requested player input may vary by the round of the game, at the initiation of the game, and/or changes to the status of the player (e.g., the player is designated a shooter).

In the example embodiment, the player terminal prompts the player to provide input to control one or more dice rolls of the ADUs. More specifically, the player terminal prompts the player to provide dice control parameters, and, at step 706, the player terminal receives the dice control parameters. The dice control parameters may be requested on a game-by-game basis, or the player may provide a single set of dice control parameters. The dice control parameters affect the intensity, style, direction, duration, and/or other suitable parameters of the force applied by an ADU to roll the associated dice. Similar to traditional dice games in which players physically grab and throw or roll the dice, the control exerted by the players is in the force itself, not the resulting dice outcome. The dice control parameters requested from the player may be abstracted from the underlying parameters used by the ADUs to control the dice roll. That is, the dice control parameters may be provided to the player in terms understood within dice games or otherwise easily understood by players. For example, the dice parameters may include dice roll initiation, bounce pattern, force intensity, tilt, force duration, and the like. As used herein, the dice control parameters may include "roll events," which refer to certain actions associated with the dice roll. For example, roll events may include, but are not limited to, dice roll initiation events, dice roll stop events, and shoot events (i.e., mid-roll changes to the force applied to the dice).

In at least some embodiments, the dice control parameters are limited to predetermined ranges to prevent the players from providing input that do not roll the dice, extend the dice roll beyond a reasonable amount of time, and/or cause unnecessary harm or wear on the components of the ADUs. These ranges may be continuous ranges from which the player selects a value or a set of discrete, predefined values. The set of predefined values may be expressed to the player as values or other suitable expressions (e.g., the dice roll duration may be selectable from: Short, Medium, and Long). In certain embodiments, at least a portion of the dice roll parameters may be established once by the player (e.g., while initiating the gaming session) and remain the same until the player manually adjusts these parameters.

For embodiments in which the gaming controller is separate from the player terminal, the dice control parameters may be transmitted to the gaming controller with the player input data (e.g., the player input data 502, shown in FIG. 5), or the dice control parameters may be converted into a format suitable for the ADUs prior to transmitting to the gaming controller. At step 708, the dice control parameters are converted to be included within the ADU control data. Other data, such as synchronization data, may be included within the ADU control data to facilitate operation of the ADUs. To convert the dice control parameters to ADU control data, data elements may be extracted, reformatted, and/or otherwise reorganized into a data format recognized by the ADUs. For example, if the dice control parameters were expressed in format abstracted from the parameters used to control the force mechanism within the ADU, the gaming controller and/or the player terminal may translate between the formats.

The translation is guided by one or more conversion tables, functions, and/or other suitable operators stored within the gaming controller and/or player terminal. In one example, the player is prompted to select a dice jump height (low, medium, or high) as part of the dice parameters. To convert the selection by the player, the gaming controller and/or the ADU stores a conversion table to map each available selection to one or more input parameters of the ADU that control the force mechanism. The "High" selection may be mapped to a set of values that increases the intensity and/or duration of the force applied by the force mechanism to cause the dice to "jump" higher relative to the values mapped to the "Low" and "Medium" selections. In another example, the gaming controller stores one or more mathematical and/or logical functions that are used to compute the conversion by including the dice control parameters as input variables. In some embodiments, the conversion tables, functions, and/or other methods of converting the dice control parameters may include random elements and/or other parameters not selected by the player to determine the conversion. That is, one player input may be linked to a plurality of converted values within the ADU control data to increase the variability and randomness of the resulting dice roll. The plurality of converted values may be within a predefined range of values such that the resulting effect on the dice roll (e.g., dice jump height) substantially matches the selection by the player. Selection of a particular converted value may be based on one or more random outcomes (e.g., generated by a random number generator) or based on one or more values external to the control of a particular player (e.g., the current time, number of participating players, current dice roll count, etc. are used to select a converted value). In certain embodiments, the conversion is performed by the ADU after receiving the dice control parameters from the gaming controller and/or the player terminal.

In at least some embodiments, the number of players participating within the dice games conducted by the system may outnumber the ADUs such that the ADUs, the gaming controller, and/or the player terminals may be configured to select one or more players from the available players to provide the dice control parameters. The selection may be random (i.e., at least partially a function of one or more random outcomes of a random number generator), partially random, and/or predetermined. Predetermined outcomes may include, for example, a set order in which the players take turns controlling the dice rolls or a player assuming a particular role within one of the dice games, such as the shooter in a craps game. In certain embodiments, the system may be configured to generate dice control parameters based on the dice control parameters from a plurality of players. In one example, the generated dice control parameters are determined based on the most popular dice control parameters selected by the participating players.

The selection method may be dynamic between each ADU and between dice outcome such that the system may adapt to the states of the current dice games. For example, the selection may prioritize games with designated players for rolling the dice (e.g., shooters) over random selection, but if no such games are being played or are ready for the next dice roll, the selection may default to a random selection. In some embodiments, some dice rolls may not be controlled by the players, particularly in the absence of new dice control parameters and/or certain dice rolls requiring no player control in the context of one or more games.

The selection of a player as described above may be based on the one or more identifiers associated with the player input and dice control parameters (e.g., terminal identifier, game identifier, and/or player identifier), or the selection of a certain set of dice control parameters may be irrespective of such identifiers. In some embodiments, the selection is performed prior to converting the dice control parameters into ADU control data such that only the selected dice control parameters are converted. The unselected dice control parameters may be stored for subsequent use or discarded to await new dice control parameters. In certain embodiments, the selection of dice control parameters is performed by the ADUs such that all of the dice control parameters may be transmitted to the ADUs or the ADUs may request specific dice control parameters. In further embodiments, the selection is performed prior to receiving player input at step 704. That is, in these embodiments, unselected players are not prompted to provide dice control parameters, but rather are prompted to provide other player input, such as game selections, wagers, and the like.

At step 710, the gaming controller transmits the ADU control data with the converted dice control parameters to the ADUs. As mentioned above, the ADU control data may be sent separately to each ADU or as whole to be distributed between the ADUs. The ADUs extract the data elements within the ADU control data to perform one or more predefined functions, including generating dice outcomes. For the dice control parameters within the ADU control data, the force mechanism and/or other suitable devices of the ADUs are configured to execute one or more functions relating to the dice outcome based on the dice control parameters. The predefined functions are used to at least initiate the dice roll to generate the dice outcome.

In certain embodiments, the ADUs may be configured to accept additional or "mid-roll" dice control parameters that affect the dice roll after the dice roll has been initiated. In certain embodiments, the mid-roll control parameters may be received prior to the dice roll (e.g., with the dice control parameters or separately) and are applied within the act of the dice roll as described herein. These mid-roll parameters may change the environment of the dice play area or the applied force (including stopping the force altogether) to affect the dice roll. In one example, the applying the mid-roll parameters change the applied force from an initial force based on the dice control parameters to a subsequent force based on the mid-roll parameters. The mid-roll parameters may include, for example, the dice control parameters provided above, shoot events (i.e., changes to the applied force), extending the dice roll, and/or dice roll termination. The mid-roll parameters may be requested from a player prior to the dice roll or during the dice roll, which may enable the players to change the dice roll in "real-time" or within a relatively small delay (e.g., 1-2 seconds). In embodiments in which the player is provided real-time control of the dice roll, the ADU and/or the gaming controller may be configured to establish a predefined period of time for the player to provide input. Conclusion of the predefined time period may end the dice roll and prevent further player input, thereby preventing or limiting pace-of-play issues from delayed dice rolls.

All players or a portion of the players may be eligible to provide mid-roll parameters. In certain embodiments, the player associated with the selected dice roll parameters also provide mid-roll parameters. The mid-roll parameters may be communicated similar to the previous dice control parameters (e.g., via steps 706-710), or the mid-roll parameters may be communicated directly from the player terminal associated with the selected player to the corresponding ADU. Selection of the player or players providing mid-roll parameters may be similar to or different from the selection of the dice control parameters described above.

In at least some embodiments, the player selected for mid-roll parameters is provided an interface via the player terminal to provide input. The interface may include input elements (hardware and/or graphical elements) dedicated to particular mid-roll parameters. For example, the player may be provided buttons for initiating a dice roll, changing a bounce pattern or dice jump height, changing the applied force, initiating a shoot event, and/or terminating a dice roll. Pressing, holding, or otherwise providing input via these input devices transmits the corresponding mid-roll parameters (or converted ADU control data representing the mid-roll parameters to the ADU.

At step 712, the gaming controller or player terminal receives dice outcome data from the ADUs based on the player-controlled dice roll and generates one or more game cycle outcomes based on the dice outcome data. A "game cycle" in this context may be a round of a game, a particular determination within the game, or other a discrete, variable game event that incorporates the random outcome of one or more dice rolls. These game cycle outcomes affect the state of the underlying games, and the gaming controller and/or the player terminal updates the game state to reflect any resolutions (e.g., wins, losses, award totals, etc.) based on the game cycle outcome. The gaming controller and/or the player terminal may be configured to broadcast or otherwise notify at least one other device or database of the updated game states based on the dice outcome data. In the example embodiment, the gaming controller transmits the game cycle outcome to the player terminal, and the player terminal presents the game cycle outcome to the player at step 714. For players participating in a plurality of games, the player terminal may present a plurality of game cycle outcomes to the player, either simultaneously or through one or more presentation sequences.

In at least some embodiments, players are provided the option to selectively enter or exit games conducted by the system. To exit a game, the player may provide player input at the player terminal indicating the intent of leaving the game, or the player terminal may automatically leave the game based on one or more termination conditions (e.g., the absence of player input for a predetermined period of time or no funds remaining in the credit balance of the player). To conclude at least some games (particularly community games), the current round or wager of the player may be required to be resolved before the player can exit the game. The player terminal and/or the gaming controller may automatically remove the player from the game at the conclusion of the round and the wager of the player is resolved. In at least some embodiments, the player terminal may provide the player an option to terminate his or her gaming session by automatically exiting all of the games the player is participating within.

At step 716, the gaming controller and/or the player terminal determines whether or not the player is continuing to participate in at least one game after the game cycle outcomes are presented. If no indication has been given to exit the games or conclude the gaming session, the method 700 continues for at least one more game cycle through steps 702-716 (or steps 704-716 if no further games are selected by the player). If, however, the player has exited all the games that the player was participating in, the gaming controller and/or the player terminal conclude the gaming session at step 718. Concluding the gaming session may include providing any remaining credits within the credit balance to the player (e.g., via providing a physical item representing the credits or providing the credits to an account or wallet associated with the player) and/or updating a player account of the player.

Figure 8:
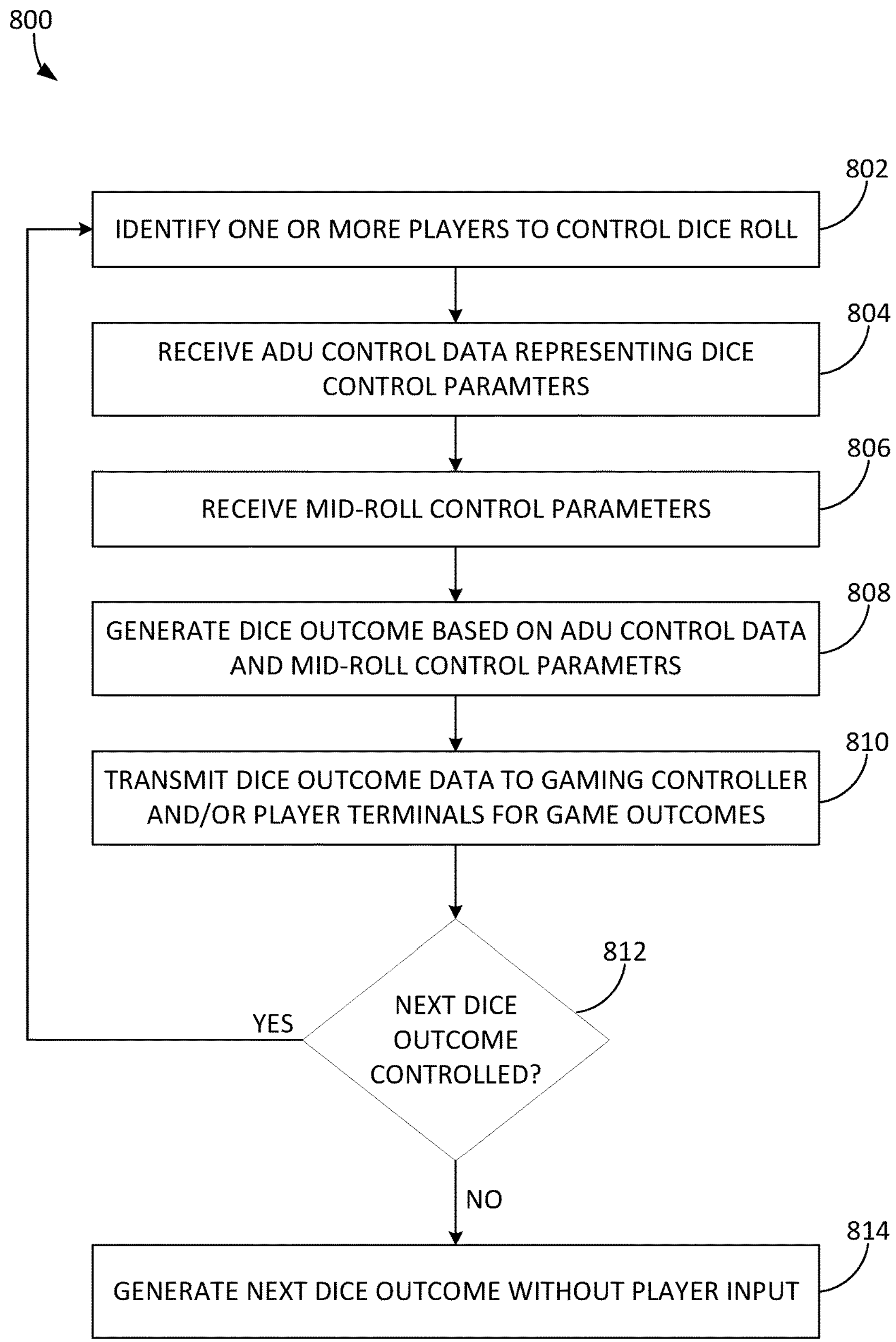
FIG. 8 is a flow diagram of an example method for generating one or more dice rolls based on player control using a gaming system, according to one or more embodiments of the present disclosure.

FIG. 8 depicts a flow diagram of an example method 800 for generating one or more dice rolls based on player control using a gaming system, such as the systems 100 and 200 (shown in FIGS. 1 and 2, respectively). The method 800 may be at least partially performed by one or more ADUs and/or a gaming controller (which may be integrated within another device described herein, including one or more ADUs). In other embodiments, the method 800 may be performed by another device and/or may include additional, fewer, or alternative steps, including those described elsewhere herein.

At step 802, the ADUs and/or the gaming controller identify one or more players to control a dice roll. It is to be understood that identifying a player in this context may not require the ADUs or the gaming controller to identify the player (e.g., name, facial photo, etc.) directly, but rather may identify or select data associated with the player, such as dice control parameters provided by the player. Selection of the players may be random, partially random, or predetermined from all of the participating players or a portion of the players. In the example embodiment, identifying or selecting a player for controlling a dice roll includes receiving dice control parameters provided by the player and converting the received dice control parameters into ADU control data. Dice control parameters of unselected players may be discarded or stored for potential use in subsequent dice rolls. As described above, converting the dice control parameters to ADU control data may include converting the dice control parameters from a format understood by players to a format accepted by the ADUs. In certain embodiments, the dice control parameters included in the ADU control data may be selected from dice control parameters provided by a plurality of players.

At step 804, the ADU receives ADU control data, including data representing the dice control parameters. The ADU extracts the data elements of ADU control data for use in one or more functions, particularly functions relating to generating a dice outcome. In the example embodiment, the dice control parameters may impact the operation of the force mechanism and/or the dice play area (e.g., tilting the surface of the dice play area) of the ADU. The dice control parameters may be applied to the next dice outcome or a plurality of subsequent dice outcomes. The dice outcome parameters may affect the initial force of the dice roll or a continuous force of the dice roll. In at least some embodiments, the ADU may be configured to receive real-time dice control parameters during the dice roll, thereby providing the player enhanced engagement with the controlled dice roll. The term "real-time" in this context does not necessarily mean the parameters provided by the player mid-roll are instantaneously applied, but rather are implemented within a relatively short delay (accounting for delays due to data transmission and processing) to be applied during the current dice roll. The mid-roll parameters may be provided by the player identified in step 802 or a different player.

At step 808, the ADU generates a dice outcome based on the ADU control data and/or the mid-roll control parameters. In some embodiments, the player control of the dice roll may be limited to either the initial dice control parameters or the mid-roll parameters such that the ADU may apply random or predefined parameters in place of the player-provided parameters. After the dice settle, the ADU determines the dice outcome (e.g., via image sensors or sensors configured to monitor the dice). At step 810, the ADU generates and transmits dice outcome data associated with the dice outcome to the gaming controller and/or player terminals for determining game outcomes. At this stage, the ADU may then transition to generating the next dice outcome.

In the example embodiment, the ADUs are configured to dynamically adjust the method of generating dice outcomes based on the state of the system, which includes the game states, the player input, and/or other suitable factors of the system. The ADUs may be adjusted between dice outcomes to be controlled by players or not controlled by players. This may be beneficial particularly for games that require a "dealer" to roll dice or in the event that no player input for the dice control parameters is provided. At step 812, the ADU or the gaming controller may determine whether a dice roll should include player input or be autonomous. The ADU and/or the gaming controller may establish a predetermined hierarchy or priority from the current game states and/or other suitable factors of the system in determining if the next dice roll will be controlled by one or more players. The priority may also be used to identify which player will be given control at steps 802 and 806. For example, a craps game designating a shooter may result in the shooter having priority over other players and an autonomous roll. In another example, for a poker-based dice game, the dice outcome representing community cards may be prioritized to be autonomous. If the determination at step 812 indicates the next dice outcome is to be autonomous, the ADU generates the next dice outcome without player input at step 814. Otherwise, the method may continue at steps 802-812.

In at least some embodiments, the ADUs are configured to provide other dynamic control and/or synchronization beyond player control. In one example, the ADUs are configured to generate dice outcomes based on music and other audio sources. More specifically, the ADUs generate dice outcomes synchronized to audio characteristics of and/or metadata markers applied to audio data of music and other audio (e.g., recorded audio from players, audio from video sources, etc.). The audio-based synchronization of the ADUs may result in variable offsets between the dice outcomes generated by the ADUs in a manner that enables the players to readily identify the variable pattern to align or synchronize his or her game play to the audio. The audio synchronization also facilitates variable offset synchronization that reduces or eliminates the computational burden of random number generation and the corresponding algorithms to define the variable offsets.

In some embodiments, with reference again to FIG. 5, the ADU control data 510 and/or the synchronization data 512 are configured to include audio data such that the ADUs 102 and/or the gaming controller 106 are configured to provide the audio synchronization as described herein. The audio data may be received from an external source (e.g., external systems 110, shown in FIG. 1), stored by the gaming system 100, and/or recorded by the gaming system through one or more audio sensors. In one example, the player terminals 104 include microphones for recording audio. In another example, the audio data is retrieved from a video source (e.g., a video of a sports event, a concert, video clips presented by the gaming system 100, and/or other videos presented by the other suitable devices. The audio data is retrieved as a dedicated audio file (or group of audio files) or is extracted by the ADUs 102 and/or the gaming controller 106 from multimedia files.

The audio data includes data elements representing audio characteristics to cause audio output devices, such as speakers and headphones, to output the corresponding audio. The audio data may also include metadata to provide additional details related to the audio, such as, and without limitation, track name, audio length, codec type, data size, and/or the like. The metadata and/or other data elements can be extracted from the audio data for analysis. The metadata and/or the audio data elements may be configured to incorporate additional data elements and/or altered by the ADUs 102 and/or the gaming controller 106 to facilitate the synchronization described herein. In one example, the ADUs 102 and/or the gaming controller 106 apply markers or tags to the audio data to define the timestamps at which one or more ADUs 102 generate dice outcomes. In other embodiments, the synchronization data is generated, stored, and/or processed separate from the audio data, particularly embodiments in which other devices (e.g., the player terminals 104 and/or external devices) are configured to retrieve and/or present the audio data.

Figure 9:
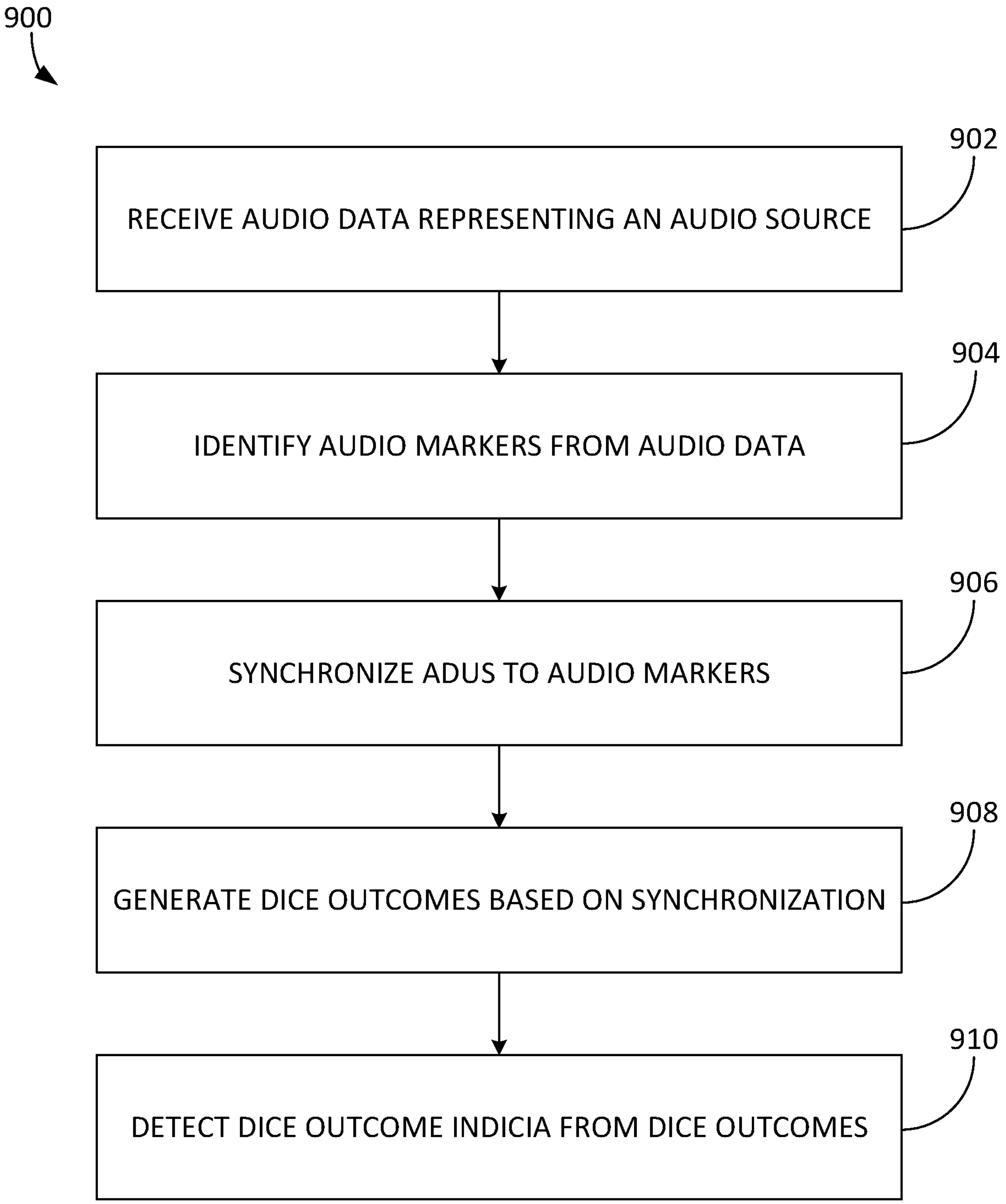
FIG. 9 is a flow diagram of an example method for synchronizing dice rolls to audio sources using a gaming system, according to one or more embodiments of the present disclosure.

FIG. 9 is a flow diagram of an example method 900 for synchronizing dice outcomes of ADUs to audio data using a gaming system (e.g., the systems 100, 200 shown in FIGS. 1 and 2). The method 900 is at least partially performed using logic circuitry of one or more ADUs and/or a gaming controller in communication with the ADUs. It is to be understood that the logic circuitry referred to herein for the method 900 may be incorporated within one ADU, multiple ADU, the gaming controller, and/or combinations thereof to provide the functions of the method 900. The method 900 may be used with one ADU or multiple ADUs. For systems with multiple ADUs, the steps of the method 900 may be performed by all, some, or one of the ADUs. In other embodiments, the method 900 is at least partially performed by other suitable devices and/or includes additional, fewer, or alternative steps, including devices and steps described elsewhere herein. In one example, the functions of the logic circuitry described herein may be performed by one or more player terminals (e.g., player terminals integrating the functionality of the gaming controller).

At step 902, the logic circuitry receives audio data corresponding to an audio source. The audio source may be, for example, music, recorded player audio, ambient audio, audio from video clips, and the like. The audio data can be received from an external device (e.g., external systems 110, shown in FIG. 1), retrieved from local data storage by the logic circuitry or another data storage device of the gaming system, and/or collected by the gaming system. In one example, a player may provide audio to a player terminal via a microphone and/or a data connection between the player terminal and a mobile computing device of the player. The audio may be converted to audio data in a format recognized by the logic circuitry (e.g., through an audio codec). In another example, the audio data is extracted from a video or animation clip to synchronize the ADUs to the video as described herein. In a further example, a plurality of songs or audio data files are stored by the gaming system, and the logic circuitry or a player selects one of the songs.

In some embodiments, step 902 may occur in response to one or more trigger events. The trigger events may include, for example and without limitation, player selection of an audio source, expiration of a predetermined period of time, a game event, an award being activated, achieving a wager threshold), a prior audio source ending, and/or a predetermined number of game rounds occurring. In certain embodiments, step 902 occurs each time after some or all of the ADUs have generated a dice outcome associated with a prior audio source. In other embodiments, the audio data may be retrieved in response to one or more random determinations.

At step 904, the logic circuitry identifies audio markers from the audio data. The audio markers are timestamps and/or other suitable data elements that enables the synchronization between the audio source and the dice outcomes of the ADUs. The audio markers may be embedded within the audio data representing the audio source, metadata of the audio data, or data altogether separate from the audio data. The audio markers are configured to be in a machine-readable format recognized and/or executable by the logic circuitry.

In some examples, the audio markers are generated by the logic circuitry based on audio characteristics (frequencies, amplitude, tone, pitch, melody, rhythm, timbre instrumentation, duration, wavelength, velocity, phase, etc.) of the audio data representing the audio source. That is, the logic circuitry is configured to perform audio analysis on the audio data to identify timestamps to associate with one or more ADU dice outcomes. In one example, the logic circuitry identifies timestamps at peak amplitudes and/or changes to the audio characteristics (representing changes within the underlying music or audio source) as audio markers. In certain embodiments, the audio data is modified to include the audio markers. The audio markers may alter the audio such that one or more sensors (e.g., a microphone) of the gaming system can recognize the audio markers from playback of the modified audio data. In some embodiments, the audio markers are included with the audio data as metadata. The audio marker metadata may be new data elements or modified data elements of the audio data. In further embodiments, the audio markers are generated separate from the audio data and include data elements for synchronizing to playback of the audio data.

In other examples, the audio markers are generated by another suitable device and are retrieved with the audio data at step 902. The audio data may already include the audio markers, or the logic circuitry retrieves the audio markers from a database of audio markers based on the audio data. In one example, the player terminals are configured to capture audio from a corresponding player, analyze the audio to generate the audio markers, and transmit the audio markers with the audio data associated with the captured audio to the ADUs and/or the gaming controller.

At step 906, the logic circuitry synchronizes the ADUs to the audio markers. More specifically, the logic circuitry assigns or allocates dice outcomes of the ADUs to upcoming audio markers. In some examples, the logic circuitry alters or adjusts the delay offset between ADUs to match the offsets between audio markers, the beginning of the audio playback, and/or the end of the audio playback. In other examples, each audio marker is distinguishable from other audio markers, and the logic circuitry, sensors of a gaming system, and/or the ADU are configured to monitor the audio playback of the unique audio signature representing the corresponding audio marker.

In some embodiments, the logic circuitry and/or the ADUs are configured to monitor the audio playback to ensure the dice outcomes are reasonably synchronized to the audio heard by the players via the audio markers. Otherwise, while the audio markers may cause the dice outcomes to be generated at offset from prior analysis of the audio data, the dice outcomes may still be untethered to the actual playback of the audio. In some embodiments, the gaming system includes sensors (e.g., microphones) that monitor audio playback. Comparing the collected audio data to stored audio data generates a timestamp or other suitable synchronization data element for synchronizing the ADUs and audio markers to the audio playback. In other embodiments, the logic circuitry and/or the ADUs receive playback data from a device configured to output the audio. The playback data may be one or more timestamps representing which audio source is being played, one or more audio timestamps (e.g., representing the beginning or other key points of the audio), and/or the like. In some examples, the audio timestamps of the playback data are assigned to audio markers. For examples without a universal clock, the ADUs may be configured to compare timestamps with the timestamps of the playback data to adjust for any inconsistencies between the clock of the playback device and the clocks of the ADUs. In certain embodiments, rather than receive the playback data from an external device, the logic circuitry and/or the ADUs are configured to output the audio source and generate the playback data. In further embodiments, any combinations of the examples provided above and other suitable means of synchronizing the ADUs to audio playback are used to verify timings of the dice outcomes.

In at least some embodiments, particularly embodiments with live audio playback monitoring, the audio markers may be adjusted to account for the processing of the monitored audio. That is, if an audio marker is associated with a particular change or moment within the audio source, the audio marker may be offset from the change or moment to account for the processing delay of capturing the audio playback and detecting the audio marker such that the resulting dice outcome is substantially aligned with the associated change or moment in the playback of the audio source.

In some embodiments, the logic circuitry assigns the ADUs to audio markers based on a previous synchronization scheme. That is, if an order of the ADUs is already defined, the logic circuitry adjusts the offsets of the ADUs based on the audio markers. In other embodiments, the order of the dice outcomes is assigned in response to identifying the audio markers. In certain embodiments, the dice outcome assignment to audio markers may also be based on game states of the current active games, player selection, and/or other suitable parameters associated with the gaming system. For example, a player designated as in control of a dice roll may select an ADU for a particular dice outcome, and the dice outcome assignments may be adjusted accordingly.

In certain embodiments, each audio marker may be assigned to dice outcomes of a plurality of ADUs. For example, if an active game requires dice from multiple ADUs for a particular round or the audio marker represents a particular moment within the audio source, the logic circuitry can assign multiple ADUs to simultaneously generate dice outcomes based on one audio marker. In some embodiments, the logic circuitry may assign multiple audio markers to one ADU, thereby causing the ADU to generate multiple dice outcomes based on the audio markers. Other suitable assignment schemes, including those described elsewhere herein, may be used to assign dice outcomes to a particular order or sequence based at least partially on the audio markers.

In some embodiments, an audio source may be associated with a plurality of audio markers such that a portion of the audio markers may be skipped or ignored when assigning dice outcomes. In certain embodiments, the dice outcomes are not tied to one particular audio marker but rather one or more ADUs generate dice outcomes as needed using the audio markers as a guide. For example, each ADU may be configured to randomly select one or more audio markers from audio data to generate dice outcomes akin to a "Duck, Duck, Goose" synchronization scheme. In another example, if an ADU is required to generate a dice outcome based on the state of one or more active games, the ADU generates the dice outcome to synchronize with an upcoming audio marker.

In at least some embodiments, the logic circuitry synchronizes the ADUs using synchronization data (e.g., synchronization data 512, shown in FIG. 5). The synchronization data may be generated by the ADUs (e.g., embodiments in which the logic circuitry is at least partially within the ADUs) or received from the gaming controller or player terminals. The synchronization data may include the audio markers, the audio data, and/or other suitable data relating to the audio synchronization of the ADUs, such as timestamps and indicators relating to the playback of the audio source. The synchronization data may be transmitted once for one or more dice outcomes, intermittently (e.g., where new synchronization data is transmitted as necessary), periodically, and/or continuously. The synchronization data associated with the audio markers is extracted and stored by the ADUs for use in the corresponding dice outcomes. In some embodiments, other data elements are modified based on the audio markers, and the modified data elements are stored in place of the audio markers.

At step 908, the ADUs generate one or more dice outcomes based on the synchronization scheme established by step 906. That is, an ADU generates a dice outcome based on the timing associated with a corresponding audio marker. In some embodiments, the ADUs generate the dice outcomes without actively monitoring the audio playback (e.g., through capturing the audio or monitor data communication with the device presenting the audio playback), but rather relies upon the offset timings of the audio markers. In other embodiments, the ADUs actively monitor the audio playback to identify the audio markers, the audio data associated with each audio marker, and/or other data related to the audio playback and generate the corresponding dice outcomes.

In some embodiments, the gaming system monitors the timing of the generated dice outcomes and the audio markers to correct any drifting or other timing errors that may result from the mechanics of the dice outcome and/or timing differences in the timestamps. If an audio marker is missed (i.e., a dice outcome is not generated for the audio marker), the logic circuitry may dynamically shift which audio markers are synchronized to which ADUs or assign the missed dice outcome to a new audio marker.

At step 910, the logic circuitry (via the ADUs) detects the dice outcome indicia from the generated dice outcomes and generates game outcomes based on the detected dice outcome indicia for the one or more active games. In some embodiments, the logic circuitry may assign new audio markers to the ADUs repeating at least a portion of the method 900 to continue to synchronize the ADUs to audio data. In certain embodiments, in the absence of new audio-based synchronization, the ADUs may default to a different synchronization scheme, such as the synchronization scheme immediately prior to the initial audio-based synchronization at step 906.

Figure 10:
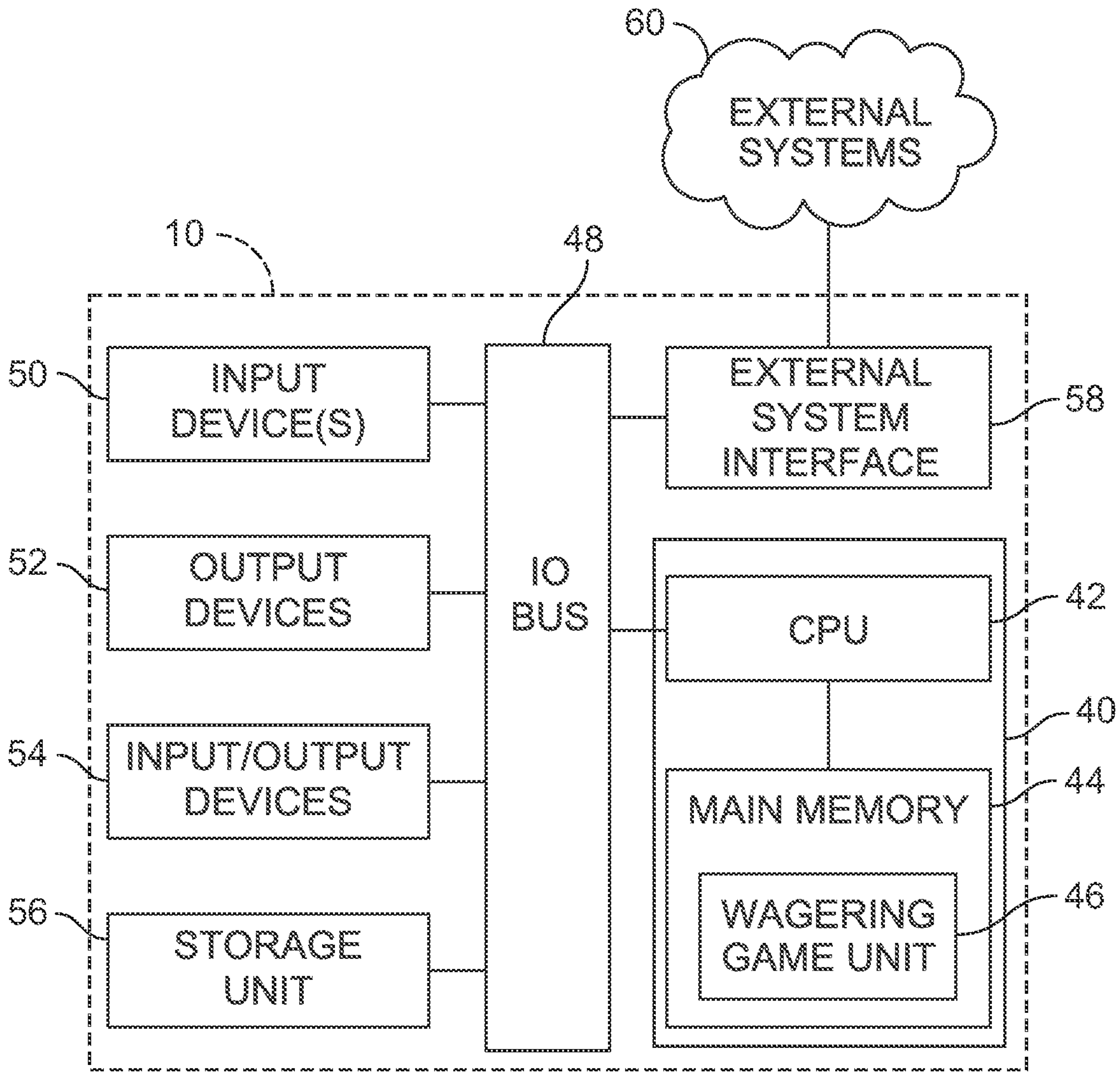
FIG. 10 is a block diagram of an example gaming machine architecture, according to one or more embodiments of the present disclosure.

FIG. 10 depicts a block diagram of an example gaming-machine architecture 10. The player terminal 104 and/or the gaming controller 106 (both shown in FIG. 1) may incorporate the architecture of the gaming machine 10 in at least some embodiments. The gaming machine 10 includes game-logic circuitry 40 securely housed within a locked box inside a gaming cabinet or housing. The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers (e.g., the gaming controller 106 in certain embodiments) or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering and/or non-wagering games to be presented, such as the dice-based games described herein, in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 4. The I/O bus 48 is also connected to a storage unit 56 and an external-system interface 58, which is connected to external system(s) 60 (e.g., wagering-game networks, the gaming network 202 shown in FIG. 2).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)— all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. In some embodiments, the dice outcomes described above replace the RNG outcomes of the CPU 42 or are used in combination with the dice outcomes to generate random game outcomes. In certain embodiments, the gaming machine 10 may be configured to conduct some games or game events based on the RNG outcomes provided by the CPU 42, other games or game events based on the dice outcomes, and further games or game events based on combinations thereof, thereby providing a flexible platform for a variety of games. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A player terminal configured to primarily conduct a plurality of dice games, the player terminal comprising:

an electronic display device; and game-logic circuitry configured to:

receive player input from a player selecting one or more dice games from the plurality of dice games for participation;

prompt, via the electronic display device, the player to provide a dice control parameter, the dice control parameter affecting an aspect of a dice roll of an automated dice unit (ADU) configured to house at least one die;

in response to receiving a player selection of the dice control parameter, convert the dice control parameter into a control data element having a machine-readable format compatible with the ADU;

transmit ADU control data including the control data element to the ADU, wherein the ADU is configured to (i) extract the control data element from the ADU control data, (ii) generate a modal control data element based on the control data element and extracted control data elements from other player terminals in communication with the ADU, the modal control data element representing a common player selection from the player terminal and the other player terminals, and (iii) generate a dice outcome by generating a dynamic force applied to the at least one die, the dynamic force adjusted based at least partially on the modal control data element;

generate a game outcome for each of the selected one or more dice games based on the dice outcome; and cause the electronic display device to present the game outcome for each of the selected one or more dice games.

2. The player terminal of claim 1, wherein the game-logic circuitry is configured to:

prompt, via the electronic display device, the player to provide a mid-roll control parameter;

in response to receiving a player selection of the mid-roll control parameter, convert the mid-roll control parameter into a second control data element for the ADU; and transmit the control data element to the ADU, wherein the ADU is configured to change the dynamic force within a dice roll from being based at least partially on the modal control data element to being based at least partially on the second control data element.

3. The player terminal of claim 2, wherein the mid-roll control parameter comprises at least one of a dice jump height, a shoot event, and a dice roll stop event.

4. The player terminal of claim 2, wherein the electronic display device presents the prompt for the player to provide the mid-roll control parameter after the dice roll associated with the mid-roll control parameter is initiated by the ADU by applying an initial dynamic force based at least partially on the modal control data element.

5. The player terminal of claim 1, wherein the player is prompted to provide the dice control parameter in response to determining the player is selected to generate a dice outcome in a first game of the selected one or more dice games.

6. The player terminal of claim 1, wherein converting the dice control parameter includes comparing the dice control parameter to a conversion table storing control data elements mapped to dice control parameters and extracting the control data element corresponding to the dice control parameter based on the comparison.

7. The player terminal of claim 1, wherein the dice control parameter comprises at least one of dice jump height, a dice roll initiation, a dice roll duration, dice bounce pattern, force intensity, tilt, or force duration.

8. A gaming system comprising:

a player terminal comprising an electronic display device and at least one player input device;

an automated dice unit (ADU) configured to house at least one die and automatically shake the at least one die via at least one force mechanism to generate a dice outcome, the ADU in communication with a plurality of player terminals including the player terminal; and game-logic circuitry configured to:

receive, via the at least one player input device, player input from a player selecting one or more dice games from a plurality of dice games for participation;

prompt, via the electronic display device, the player to provide a dice control parameter, the dice control parameter affecting an aspect of a dice roll of the ADU;

in response to receiving a player selection of the dice control parameter, convert the dice control parameter into a control data element having a machine-readable format compatible with the ADU;

transmit ADU control data including the control data element to the ADU;

cause the ADU to (i) extract the control data element from the ADU control data, (ii) generate a modal control data element based on the control data element and extracted control data elements from other player terminals of the plurality of player terminals, the modal control data element representing a common player selection from the plurality of player terminals, and (iii) generate a dice outcome by generating a dynamic force applied to the at least one die, the dynamic force adjusted based at least partially on the modal control data element;

generate a game outcome for each of the selected one or more dice games based on the dice outcome; and cause the electronic display device to present the game outcome for each of the selected one or more dice games.

9. The gaming system of claim 8, wherein the game-logic circuitry is configured to:

prompt, via the electronic display device, the player to provide a mid-roll control parameter;

in response to receiving a player selection of the mid-roll control parameter, convert the mid-roll control parameter into a second control data element for the ADU; and cause the ADU to change the dynamic force within a dice roll from being based at least partially on the modal control data element to being based at least partially on the second control data element.

10. The gaming system of claim 9, wherein the electronic display device presents the prompt for the player to provide the mid-roll control parameter after the dice roll associated with the mid-roll control parameter is initiated by the ADU by applying an initial dynamic force based at least partially on the modal control data element.

11. The gaming system of claim 8, wherein the player is prompted to provide the dice control parameter in response to determining the player is selected to generate a dice outcome in a first game of the selected one or more dice games.

12. The gaming system of claim 8, wherein the player is prompted to provide the dice control parameter in response to a random selection of the player from a plurality of players providing dice control parameters.

13. The gaming system of claim 8, wherein converting the dice control parameter includes comparing the dice control parameter to a conversion table storing control data elements mapped to dice control parameters and extracting the control data element corresponding to the dice control parameter based on the comparison.

14. The gaming system of claim 8, wherein the dice control parameter comprises at least one of dice jump height, a dice roll initiation, a dice roll duration, dice bounce pattern, force intensity, tilt, or force duration.

15. A method for conducting a plurality of dice games using a gaming system comprising an electronic display device, at least one player input device, an automated dice unit (ADU) configured to house at least one die, and game-logic circuitry in communication with the electronic display device, the at least one player input device, and the ADU, the method comprising:

receiving, via the at least one player input device, player input from a player of a plurality of players selecting one or more dice games from a plurality of dice games for participation;

prompting, via the electronic display device, the player to provide a dice control parameter, the dice control parameter affecting an aspect of a dice roll of the ADU;

in response to receiving a player selection of the dice control parameter, converting, by the game-logic circuitry, the dice control parameter into a control data element having a machine-readable format compatible with the ADU;

transmitting, by the game-logic circuitry, ADU control data including the control data element to the ADU;

causing, by the game-logic circuitry, the ADU to (i) extract the control data element from the ADU control data, (ii) generate a modal control data element based on the control data element and extracted control data elements associated with other players of the plurality of players participating within the plurality of dice games, the modal control data element representing a common player selection from the player and the other players, and (iii) generate a dice outcome by generating a dynamic force applied to the at least one die using at least one force mechanism, the dynamic force adjusted based at least partially on the modal control data element;

generating, by the game-logic circuitry, a game outcome for each of the selected one or more dice games based on the dice outcome; and causing, by the game-logic circuitry, the electronic display device to present the game outcome for each of the selected one or more dice games.

16. The method of claim 15 further comprising:

prompting, via the electronic display device, the player to provide a mid-roll control parameter;

in response to receiving a player selection of the mid-roll control parameter, converting, by the game-logic circuitry, the mid-roll control parameter into a second control data element for the ADU; and causing, by the game-logic circuitry, the ADU to change the dynamic force within a dice roll from being based at least partially on the modal control data element to being based at least partially on the second control data element.

17. The method of claim 16, wherein the mid-roll control parameter comprises at least one of a dice jump height, a shoot event, and a dice roll stop event.

18. The method of claim 16, wherein the electronic display device presents the prompt for the player to provide the mid-roll control parameter after the dice roll associated with the mid-roll control parameter is initiated by the ADU by applying an initial dynamic force based at least partially on the modal control data element.

19. The method of claim 15, wherein the player is prompted to provide the dice control parameter in response to determining the player is selected to generate a dice outcome in a first game of the selected one or more dice games.

20. The method of claim 15, wherein the player is prompted to provide the dice control parameter in response to a random selection of the player from a plurality of players providing dice control parameters.

21. The method of claim 15, wherein converting the dice control parameter includes comparing the dice control parameter to a conversion table storing control data elements mapped to dice control parameters and extracting the control data element corresponding to the dice control parameter based on the comparison.

* * * * *